US011308425B2

(12) United States Patent
Ha et al.

(10) Patent No.: US 11,308,425 B2
(45) Date of Patent: Apr. 19, 2022

(54) METHOD AND APPARATUS FOR PROVIDING FLEET SYSTEM USING IDENTITY DEVICE

(71) Applicants: HYUNDAI MOTOR COMPANY, Seoul (KR); KIA MOTORS CORPORATION, Seoul (KR)

(72) Inventors: Jae Jun Ha, Hwaseong-si (KR); Young Jun Moon, Sejong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 196 days.

(21) Appl. No.: 16/838,789

(22) Filed: Apr. 2, 2020

(65) Prior Publication Data
US 2020/0342377 A1  Oct. 29, 2020

(30) Foreign Application Priority Data
Apr. 23, 2019 (KR) .................. 10-2019-0047579

(51) Int. Cl.
G06Q 10/06 (2012.01)
H04W 4/46 (2018.01)
G06F 11/30 (2006.01)
G06F 21/31 (2013.01)
G06Q 50/30 (2012.01)

(52) U.S. Cl.
CPC ........ *G06Q 10/06311* (2013.01); *H04W 4/46* (2018.02); *G06F 11/3013* (2013.01); *G06F 21/31* (2013.01); *G06Q 50/30* (2013.01)

(58) Field of Classification Search
CPC ............ G06Q 10/06311; G06Q 50/30; G06Q 30/0645; H04W 4/46; H04W 8/183; H04W 12/06; H04W 12/40; G06F 11/3013; G06F 21/31; G06F 21/32; B60R 16/02; B60R 25/04; B60R 25/2018; G08G 1/0968; B60W 50/0098; B60W 2050/0079; B60W 2540/043; G07C 5/008
See application file for complete search history.

(56) References Cited

U.S. PATENT DOCUMENTS

| 8,841,987 | B1* | 9/2014 | Stanfield | G07C 9/00857 340/5.61 |
|---|---|---|---|---|
| 9,365,188 | B1* | 6/2016 | Penilla | G06Q 10/02 |
| 9,643,619 | B2* | 5/2017 | Sinaguinan | G06F 9/44505 |
| 2011/0112969 | A1* | 5/2011 | Zaid | G06Q 50/30 705/50 |
| 2016/0318481 | A1* | 11/2016 | Penilla | B60R 25/241 |
| 2016/0325754 | A1* | 11/2016 | Stahulak | B60W 40/08 |
| 2017/0050645 | A1* | 2/2017 | Porembski | H04W 4/40 |

(Continued)

*Primary Examiner* — An T Nguyen
(74) *Attorney, Agent, or Firm* — Morgan, Lewis & Bockius LLP

(57) ABSTRACT

A method of providing a moving object sharing service using a plurality of identity devices includes controlling a moving object based on a first identity device, transferring control authority of the moving object to a second identity device when the second identity device is recognized in the moving object, and controlling the moving object based on the second identity device. The first identity device corresponds to a first user who provides sharing of the moving object, and the second identity device corresponds to a second user who uses the moving object shared by the first user.

20 Claims, 14 Drawing Sheets

(56) References Cited

U.S. PATENT DOCUMENTS

| | | | |
|---|---|---|---|
| 2017/0178035 A1* | 6/2017 | Grimm | G06Q 30/0645 |
| 2018/0326947 A1* | 11/2018 | Oesterling | G07C 9/00571 |
| 2018/0342001 A1* | 11/2018 | Chavarria | G06Q 20/10 |
| 2020/0062269 A1* | 2/2020 | Vardharajan | G07C 5/008 |
| 2020/0186590 A1* | 6/2020 | Penilla | G06Q 10/20 |
| 2020/0342377 A1* | 10/2020 | Ha | H04W 4/46 |
| 2021/0024035 A1* | 1/2021 | Nakashima | B60R 25/04 |
| 2021/0194960 A1* | 6/2021 | Ventimiglia | G01C 21/3438 |
| 2021/0221387 A1* | 7/2021 | Vardharajan | B60W 50/0098 |
| 2021/0237683 A1* | 8/2021 | Nakashima | B60R 25/31 |

\* cited by examiner

| VEHICLE SETTINGS | NOTE |
|---|---|
| AUTONOMOUS DRIVING LEVEL | LEVEL 1 |
| VEHICLE SEAT | LIGHTING ANGLE, BRAKE DISTANCE |
| DASHBOARD MODE SETTINGS | ANALOG MODE |
| USED CHANNEL SETTINGS | MUSIC CHANNEL |
| NAVIGATION SETTINGS | TRAVELING DIRECTION MODE |
| PERSONAL DEVICE SETTINGS | PERSONAL DEVICE COUPLING MODE |
| MIRROR SETTINGS | REARVIEW MIRROR, SIDE-VIEW MIRROR |

FIG. 5
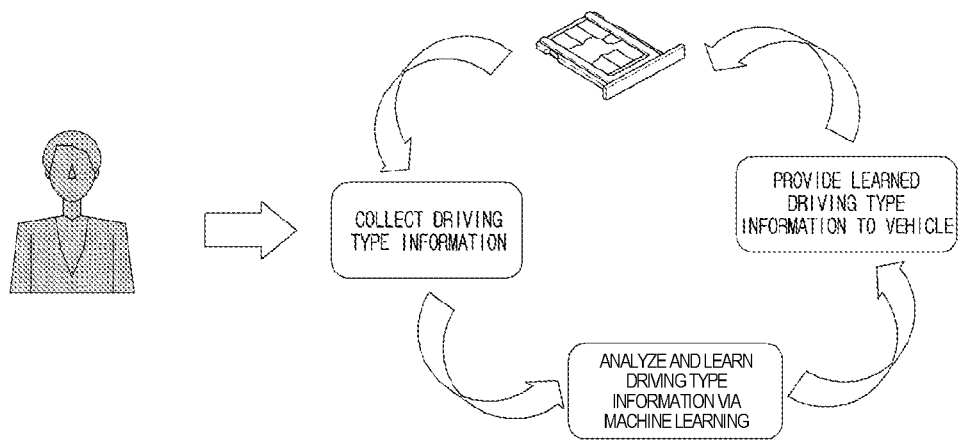
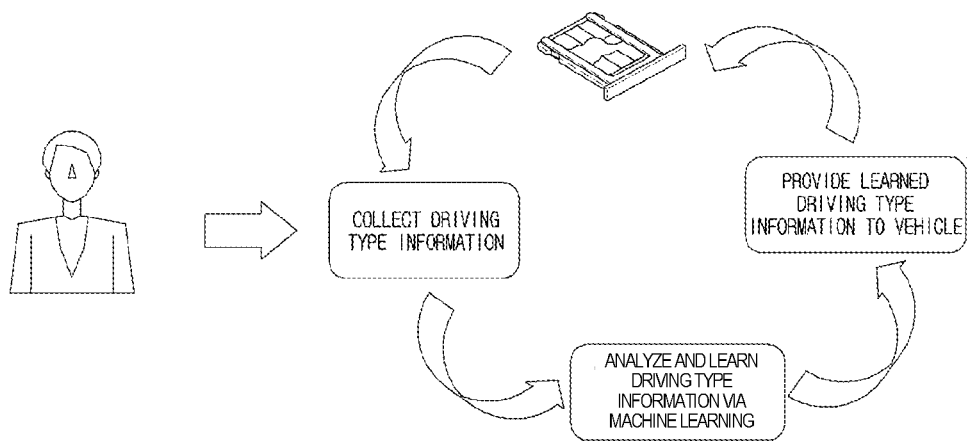

FIG. 9
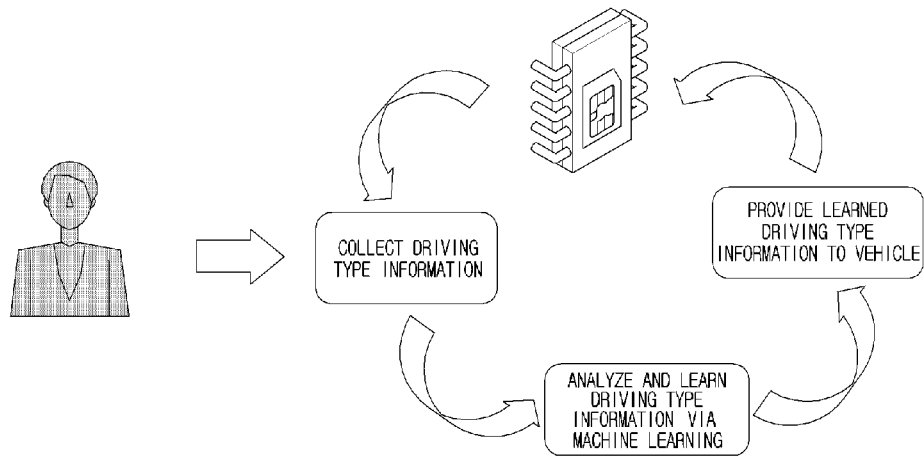
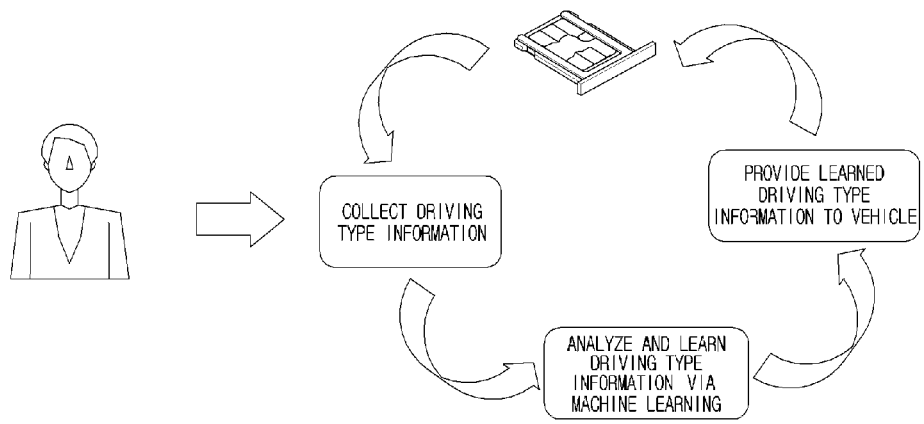

METHOD AND APPARATUS FOR PROVIDING FLEET SYSTEM USING IDENTITY DEVICE

CROSS REFERENCE TO RELATED APPLICATION

The present application claims the benefit of priority to Korean Patent Application No. 10-2019-0047579 filed on Apr. 23, 2019 in the Korean Intellectual Property Office, the entire disclosure of which is incorporated herein by reference.

TECHNICAL FIELD

The present disclosure relates to a method and apparatus for providing a fleet system using an identity device.

BACKGROUND

Subscriber identity modules (SIMs) are used in smart devices or smartphones. In addition, universal subscriber identity module (USIM) technology is an evolution of a SIM card and may be a step up from the SIM used in a global system for mobile communications (GSM). At this time, the USIM may be a small chip essentially inserted into a third-generation mobile communication (WCDMA) terminal capable of video calling. The USIM includes a small CPU and a memory. The CPU may identify a user using an encryption/decryption function and the memory may be used as a storage space for additional services. The USIM has been used in various forms. Such a SIM card is applicable to a moving object, which will be described below.

In addition, as technology has advanced, the concept of vehicle ownership is weakening and use of shared vehicles is increasing. Specifically, needs to share vehicles such as car sharing or carpooling are increasing, but existing shared vehicles do not reflect various tendencies of individual users. Therefore, there is a need for a system adapted to suit individuals.

Vehicles are shared in a specific area or residence for convenience of living, and there is a growing need to receive services using them. However, satisfaction with a vehicle sharing service is not high as compared to a privately own vehicle. Since the vehicle sharing system is not properly provided, it is difficult to provide vehicle security and services. Hereinafter, a vehicle fleet system is provided in consideration of the foregoing.

The information disclosed in the Background section above is to aid in the understanding of the background of the present disclosure, and should not be taken as acknowledgement that this information forms any part of prior art.

SUMMARY

Accordingly, the present disclosure has been made keeping in mind the above problems occurring in the prior art.

An object of the present disclosure is to provide a fleet system using an identity device.

Another object of the present disclosure is to provide a moving object sharing service using an identity device.

Another object of the present disclosure is to provide a method of recognizing a moving object owner and a moving object renter using an identity device.

According to the present disclosure, a method of providing a moving object sharing service using a plurality of identity devices includes controlling a moving object based on a first identity device, transferring control authority of the moving object to a second identity device when the second identity device is recognized in the moving object, and controlling the moving object based on the second identity device, wherein the first identity device corresponds to a first user who provides sharing of the moving object, and the second identity device corresponds to a second user who uses the moving object shared by the first user.

According to another exemplary embodiment of the present disclosure, a moving object for providing a sharing service through a plurality of identity devices includes a transceiver configured to transmit and receive a signal, and a processor configured to control the transceiver, wherein the processor is configured to control the moving object based on a first identity device, to transfer control authority of the moving object to a second identity device when the second identity device is recognized in the moving object, and to control the moving object based on the second identity device. The first identity device corresponds to a first user who provides sharing of the moving object, and wherein the second identity device corresponds to a second user who uses the moving object shared by the first user.

According to another exemplary embodiment of the present disclosure, a fleet system includes a moving object and a plurality of identity devices, wherein the moving object is controlled based on a first identity device, control authority of the moving object is transferred to a second identity device when the second identity device is recognized in the moving object, and the moving object is controlled based on the second identity device. The first identity device corresponds to a first user who provides sharing of the moving object, and the second identity device corresponds to a second user who uses the moving object shared by the first user.

The following matters are commonly applicable to the method of providing the moving object sharing service, the moving object and the system.

According to an exemplary embodiment of the present disclosure, the moving object may perform identification and authentication of the second user corresponding to the second identity device when the second identity device is installed in the moving object, and the second identity device may be recognized in the moving object when the identification and authentication of the second user are completed.

According to an exemplary embodiment of the present disclosure, when the identification and authentication of the second user are completed, the moving object may change setting information of the moving object based on the second identity device.

According to an exemplary embodiment of the present disclosure, the setting information of the moving object may include at least one of a position of a driver's seat, a height of the driver's seat, a color of an interior lighting, brightness of the interior lighting, a position of a room mirror, an angle of the room mirror, a position of a side-view mirror, an angle of the side-view mirror, an inside temperature, an angle of a steering wheel, tire pressure, an autonomous driving function setting variable, a transmission setting mode, a dashboard mode, navigation settings, content settings, or a wireless communication connection mode.

According to an exemplary embodiment of the present disclosure, the moving object may receive a moving object use request message from a device of the second user who uses the moving object, based on the first identity device before recognizing the second identity, and transmit a response message as to whether to use the moving object to the device of the second user who uses the moving object, based on the moving object use request message.

According to an exemplary embodiment of the present disclosure, the moving object may perform identification and authentication of the second user corresponding to the second identity device when the moving object allows use of the moving object based on the moving object use request message, and the second identity device may be recognized in the moving object when the identification and authentication of the second user is completed.

According to an exemplary embodiment of the present disclosure, the first identity device may store information related to use of the moving object when the second identity device is recognized in the moving object.

According to an exemplary embodiment of the present disclosure, the first identity device may transmit the information related to use of the moving object to a device of the first user who provides sharing of the moving object, via a first network based on the first identity device.

According to an exemplary embodiment of the present disclosure, when an event occurs in the moving object in a case where the moving object is controlled based on the first identity device, the first identity device may transmit information on the event to a device of the first user who provides sharing of the moving object, via a first network.

According to an exemplary embodiment of the present disclosure, when an event occurs in the moving object in a case where the moving object is controlled based on the second identity device, the second identity device may transmit information on the event to a device of the second user who uses the moving object, via a second network.

According to an exemplary embodiment of the present disclosure, when the second identity device is detached from the moving object, the control authority of the moving object may be transferred to the first identity device.

According to an exemplary embodiment of the present disclosure, the second identity device is not detachable from the moving object when the moving object is turned on, and the second identity device may be switched to a detachable state when the moving object is turned off.

According to an exemplary embodiment of the present disclosure, an additional authentication procedure for detachment may be performed before the second identity device is detached from the moving object, and, when authentication is completed based on the additional authentication procedure, the second identity device may be switched to a detachable state.

According to an exemplary embodiment of the present disclosure, when the additional authentication procedure is performed, the moving object may transmit an authentication request message to a device corresponding to the first identity device, and the authentication may be completed when the moving object receives an authentication response message including authentication complete information from the device corresponding to the first identity device.

According to an exemplary embodiment of the present disclosure, at least one of the first identity device or the device corresponding to the first identity device may determine whether the moving object is abnormal based on at least one position information, setting information or status information of the moving object, and, upon determining that the moving object is normal, the authentication response message including the authentication complete information may be transmitted to the moving object.

According to an exemplary embodiment of the present disclosure, the first identity device may store setting information for the first user who provides sharing the moving object, and the second identity device may store setting information for the second user who uses the moving object.

According to an exemplary embodiment of the present disclosure, when the moving object is controlled by the first user who provides sharing of the moving object, based on the first identity device, at least one of driving information or operation information of the moving object may be updated based on the first identity device.

According to an exemplary embodiment of the present disclosure, when the moving object is controlled by the second user who uses the moving object, based on the second identity device, at least one of driving information or operation information of the moving object may be updated based on the second identity device.

According to an exemplary embodiment of the present disclosure, when the second identity device is recognized and the control authority of the moving object is transferred, the second identity device may be detached.

According to an exemplary embodiment of the present disclosure, when the second identity device is detached, setting information for the second user corresponding to the second identity device may not be stored in the second identity device.

According to an exemplary embodiment of the present disclosure, when the second identity device is re-recognized in a state in which the second identity device is detached, sharing of the moving object of the second user corresponding to the second identity device may end.

According to an exemplary embodiment of the present disclosure, the first identity device may be an embedded identity device, and the second identity device may be an installed identity device.

Effects obtained in the present disclosure are not limited to the above-mentioned effects, and other effects not mentioned above may be clearly understood by those skilled in the art from the following description.

BRIEF DESCRIPTION OF THE DRAWINGS

The above and other objects, features and other advantages of the present disclosure will be more clearly understood from the following detailed description taken in conjunction with the accompanying drawings, in which:

FIG. 5 is a view showing a method of updating user information based on a plurality of identity devices according to one exemplary embodiment of the present disclosure;

FIG. 9 is a view showing a method of updating user information at an identity device according to one exemplary embodiment of the present disclosure;

DETAILED DESCRIPTION

Figure 1:
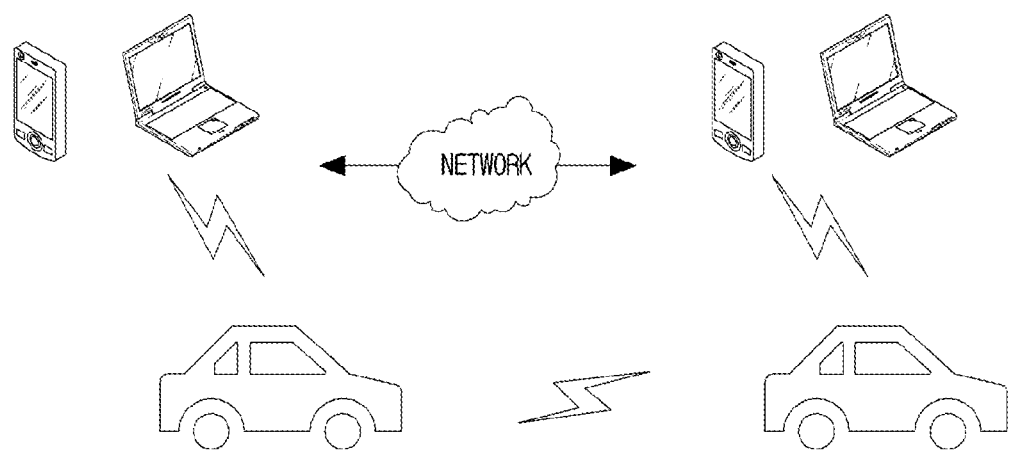
FIG. 1 is a view showing a method of performing communication between a moving object and other devices according to one exemplary embodiment of the present disclosure.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present disclosure and the way of attaining them will become apparent with reference to embodiments described below in detail in conjunction with the accompanying drawings. Embodiments, however, may be embodied in many different forms and should not be constructed as being limited to example embodiments set forth herein. Rather, these embodiments are provided so that this disclosure will be complete and will fully convey the scope of the disclosure to those skilled in the art.

FIG. 1 is a view showing a method of, at a moving object, performing communication with another moving object or a device via a network according to one exemplary embodiment of the present disclosure. Referring to FIG. 1, the moving object may perform communication with another moving object or another device. For example, the moving object may perform communication with another moving object or another device based on cellular communication, WAVE communication, DSRC (Dedicated Short Range Communication) or other communication schemes. That is, as a cellular communication network, an LTE or 5G communication network, a Wi-Fi communication network, a WAVE communication network, etc., may be used. In addition, a short-range communication network used in a moving object, such as DSRC, may be used, without being limited to the above-described embodiments.

In addition, for example, in relation to communication of the moving object, a module for performing communication only with a device located inside the moving object and a module for performing communication with a device located outside the moving object may be separately provided, for security of the moving object. For example, communication with a device in a certain range of the moving object, such as Wi-Fi communication, may be performed inside the mobile terminal, for security. For example, the moving object and a device privately owned by a driver of the moving object may include respective communication modules for performing only communication with each other. That is, the moving object and the device privately owned by the driver of the moving object may use a communication network disconnected from an external communication network. In addition, for example, the moving object may include a communication module for performing with an external device. In addition, for example, the communication module may be implemented as a single module. That is, the moving object may perform communication with another device via a single module, without being limited to the above-described embodiment. That is, in the moving object, the communication method may be implemented based on various methods, without being limited thereto the above-described embodiment.

At this case, for example, the moving object may refer to a movable device. For example, the moving object may include a vehicle (including an autonomous vehicle, an automated vehicle, etc.), a drone, a mobility, a pallet, a mobile office, a mobile hotel, a personal air vehicle (PAV), etc. In addition, the moving object may include other types of movable devices, without being limited to the above-described embodiments.

FIGS. 2a, 2b, 2c, and 2d are views showing a method of applying an identity device to a moving object according to one exemplary embodiment of the present disclosure.

For example, an identity device may have at least one of functions for identifying at least one of a user, an object to be controlled, or a service object. In addition, for example, the identity device may have an ID function. In addition, for example, the identity device may include at least one of a smart device, a smart module, a user identification module, or an identification module. That is, the identity device may be a hardware device, or a software program executed by a processor, and may be used for identification. For example, the identity device may be a subscriber identity module (SIM). For example, the SIM applied to the moving object as the identity device may be at least one of a Mobility SIM (M-SIM) or a Vehicle SIM (V-SIM). In addition, for example, the identity device may be equal to or compatible with an existing SIM, without being limited to the above-described embodiment. Although the identity device is focused upon in the following description, this may be replaced by a smart module, a user module, a SIM, etc., without being limited thereto. However, for convenience of description, the identity device will be focused upon in the following description. As described above, the identity device may be applied to the moving object in consideration of the case where the moving object performs communication with an external device. For example, a smartphone may include a universal subscriber identity module (USIM), which is used to recognize the user of the smartphone to provide a service. For example, when an apparatus is compatible with the same brand or the identity device, only the identity device of the user may be changed to identify the user of the apparatus, and a service may be provided based on the same. The moving object may also include an identity device card embedded therein, based on the above description. For example, the identity device applied to the moving object may be referred to as a vehicle SIM (VSIM). That is, a new type of identity device may be applied as the identity device applied to the moving object. For example, the VSIM may be compatible with a USIM or another SIM. In addition, the VSIM may further provide other services in consideration of the characteristics of the moving object, without being limited to the above-described embodiment. In addition, an identity device card applied to the moving object may be provided and may be referred to as another name, without being limited to the above-described embodiment.

Figure 2A:
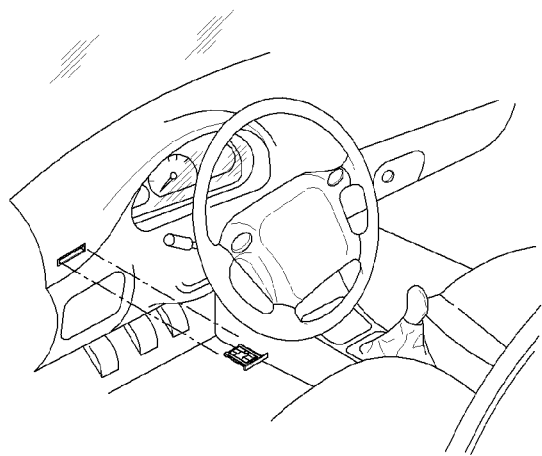
FIGS. 2a, 2b, 2c, and 2d are views showing a method of applying an identity device to a moving object according to one exemplary embodiment of the present disclosure.
Figure 2B:
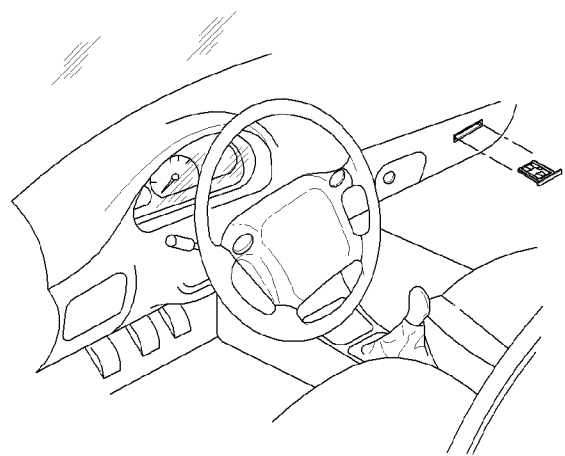

For example, referring to FIGS. 2a-2d, a part, to which the identity device is applicable, may be located in the moving object. FIGS. 2a-2d show examples of applying the identity device to the moving object, without being limited to the above-described embodiment. More specifically, as shown in FIG. 2a, a part to which the identity device is applied, may be a portion of the driver's seat of the moving object, which is visually identified. As another example, as shown in FIG. 2b, the identity device may be applied to an inside of a glove box of a passenger seat of the moving object. As another example, the identity device may be inserted into a part in which the display of the moving object is located, without being limited to the above-described embodiment.

Figure 2C:
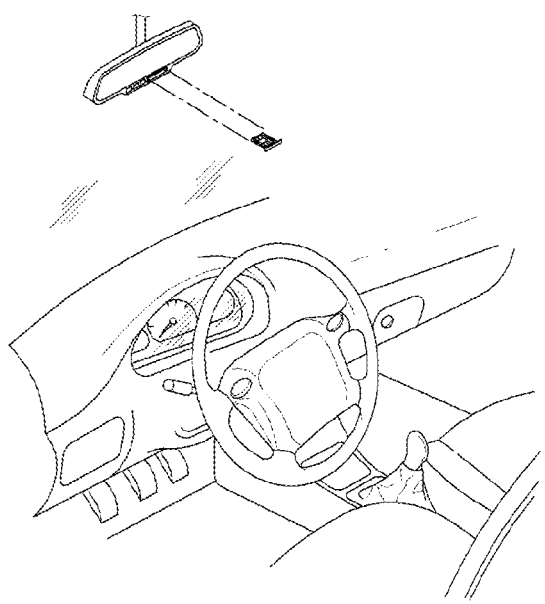
Figure 2D:
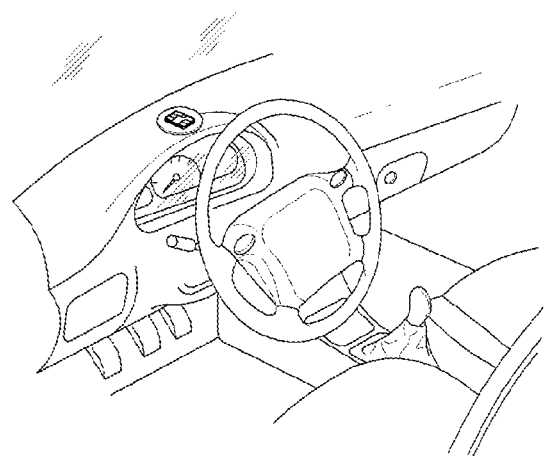

As another example, as shown in FIG. 2c, the identity device may be installed in a room mirror of the moving object. For example, since the room mirror of the moving object is easily accessible to the passenger while affecting traveling of the moving object or the other devices of the moving object, the identity device may be installed in the room mirror of the moving object. As another example, as shown in FIG. 2d, the identity device may be installed in a cradle or a pad. For example, when the moving object is controlled by the identity device, a large number of cases of replacing the identity device for each user may occur. In view of the foregoing, in order to enhance convenience of installing the identity device, the identity device may be installed in the cradle or the pad and used to control the moving object. For example, the identity device may be installed in a cradle or a pad having magnetic properties. In addition, for example, the identity device may be installed in a cradle or a pad based on another manner, without being limited to the above-described embodiment.

As another example, the identity device may be implemented in combination with a tool key or a car key in consideration of the portability of the identify device. That is, the identity device may be installed in the tool key or the car key, and may be detached from the car key to be used in a state of being installed in the moving object. For example, a USIM or an identity device similar thereto may have a relatively small size. In addition, the identity device has a portion which is in contact with the moving object and thus there is a need for preventing damage to the contact portion. In view of the foregoing, the identity device may be coupled to the car key or the tool key.

As another example, the car key or the tool key itself may be an identity device. That is, each user may own their car key or tool key as the identity device, and may control the moving object using the same. For example, when the car key or the tool key is an identity device, the car key or the tool key may be installed in the moving object. In addition, for example, the car key or the tool key may perform communication with the moving object via short-range communication (e.g., Bluetooth, beacon or NFC), thereby performing message exchange or identification. That is, the car key or the tool key, to which the uniqueness of an individual is applied, may be used as the identity device, without being limited to the above-described embodiment.

As another example, the identity device may be installed through an existing device installed in the moving object. For example, an existing device (e.g., a hi-pass terminal or a black box) may be already installed in the moving object. At this time, if a separate installation portion is configured in the moving object in order to install the identity device, since equipment for the moving object needs to be changed and a component or part for additional installation may be necessary, the existing device may be used in order to install the identity device. That is, a component in which the identity device may be installed may be added to the existing device already installed in the moving object and the identity device may be installed in the component based on the same. As another example, the identity device may be recognized through an existing terminal (e.g., a USB port, or a cigar jack) included in the moving object.

As another example, the identity device may be applied at any position in an authenticable range of the moving object, and the identity device may be applied integrally with or independently of a control unit, a communication unit or a configuration part of the moving object.

More specifically, the moving object may include a separate installation portion for installation of the identity device or a part in which the identity device is installed. That is, the identity device may be installed in the moving object in a state of being separated from the other parts, as one independent part. As another example, the identity device may be installed in the moving object to be included in at least one of the control unit, the communication unit, or other units, as described above. For example, in the moving object, the control unit or the communication unit may perform communication with an external device or may control information. At this time, the identity device may provide necessary information to the control unit and the communication unit or enable the control unit and the communication unit to operate through identification and authentication. That is, the identity device may be closely related to the control unit or the communication unit and thus may be installed in the moving object in combination with the above-described units. That is, the identity device may be installed in the moving object integrally with other units. As another example, the identity device may be implemented as an identity device embedded in the moving object. The embedded identity device may be physically implemented in the moving object or may be implemented as a software program in the moving object operation and design process, without being limited to the above-described embodiment. This will be described below.

For example, the equipment of the moving object is changed or an additional component is installed in order to install the identity device, cost may increase. In view of the foregoing, the identity device may be installed (or recognized) through an existing terminal included in the moving object. Therefore, the identity device may be easily applied to the existing moving object, without being limited to the above-described embodiment.

At this time, when the identity device is applied to the moving object, the moving object may perform subscriber identification based on the identity device. That is, similarly to, e.g., a smartphone, the moving object may identify the user of the moving object based on the identity device. At this time, the identity device may include user environment information such as, for example, driving record information of a user, navigation setting information, moving object setting information, driver's seat information, steering information, etc. That is, by applying the identity device to the moving object, it is possible to establish a system based on information on use of the moving object. In addition, for example, when the identity device is not applied to the moving object, operation may be impossible. For example, the moving object may operate only when the identity device is applied and recognized. However, for example, some driving may be possible in consideration of emergency.

For example, as described above, when the identity device is not identified and authenticated in the moving object, the control authority of the moving object may not be granted. For example, in the case where the moving object is a vehicle, in the past, the vehicle may be immediately controlled when the vehicle is turned on. However, when the identity device is applied, the vehicle may be controlled only when the vehicle is turned on and identification and authentication of the identity device is completed. More specifically, the moving object may operate based on full autonomous driving. In addition, for example, the moving object may perform communication with other devices via a communication network and operate based on information received through communication. However, in the moving object, since a plurality of operations and functions may be defined for the purpose of movement, when identification and authentication are not guaranteed, a security problem or a risk of an accident may occur. In view of the foregoing, the moving object may be turned on differently from the existing method and may be controlled when identification and authentication are performed based on the identity device.

As another example, the identity device may operate regardless of whether the moving object is turned on. For example, the moving object may include devices for supplying power to the other existing devices, such as a black box. At this time, the identity device may operate by receiving power from the moving object. As another example, the identity device may provide power and operate by itself. In addition, for example, the identity device may supply power and operate based on a separate charging device such as, e.g., wireless charging or solar charging. At this time, the operation of the identity device may not require large power consumption and may operate regardless of whether the moving object is turned on. The identity device may operate by receiving power from the moving object or by supplying power by itself. That is, the identity device may operate regardless of whether the moving object is turned on, without being limited to the above-described embodiment. At this time, for example, even when the moving object is turned on, the identity device may perform identification and authentication. For example, in order to trigger the identity device when the moving object is not turned on, identification and authentication may be performed when the personal device of an owner of the moving object is recognized.

As another example, even if the moving object is not turned on, identification and authentication of the identity device may be performed when it is recognized that the driver or another user rides in the moving object, without being limited to the above-described embodiment. That is, even if the moving object is not turned on, the identity device may operate, without being limited to the above-described embodiment.

At this time, in view of the foregoing, it is possible to prevent the identity device from being arbitrarily removed from the moving object. More specifically, as described above, the risk of security and accidents may be relatively high in the case of the moving object. In addition, as described above, when the identity device is arbitrarily detached while operation is performed based on the identity device, the risk of accidents may occur based on authentication error. In view of the foregoing, it is possible to prevent the identity device from being arbitrarily detached. For example, before the moving object is turned on, the identity device may be arbitrarily attached and detached. That is, when the moving object does not operate, attachment/detachment of the identity device may not be locked. Accordingly, a user who wants to use the moving object may replace the identity device before the moving object is turned on, and use an identity device suitable for the user.

Figure 3A:
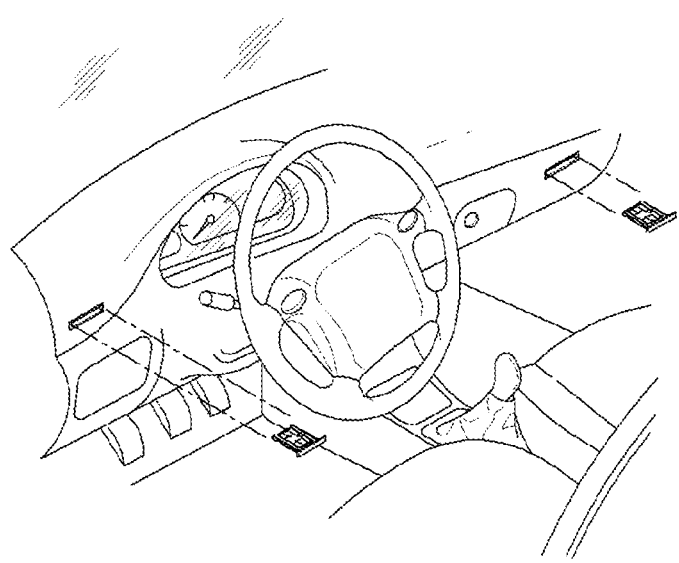
FIGS. 3a, 3b, and 3c are views showing a method of installing a plurality of identity devices in a moving object according to one exemplary embodiment of the present disclosure.
Figure 3B:
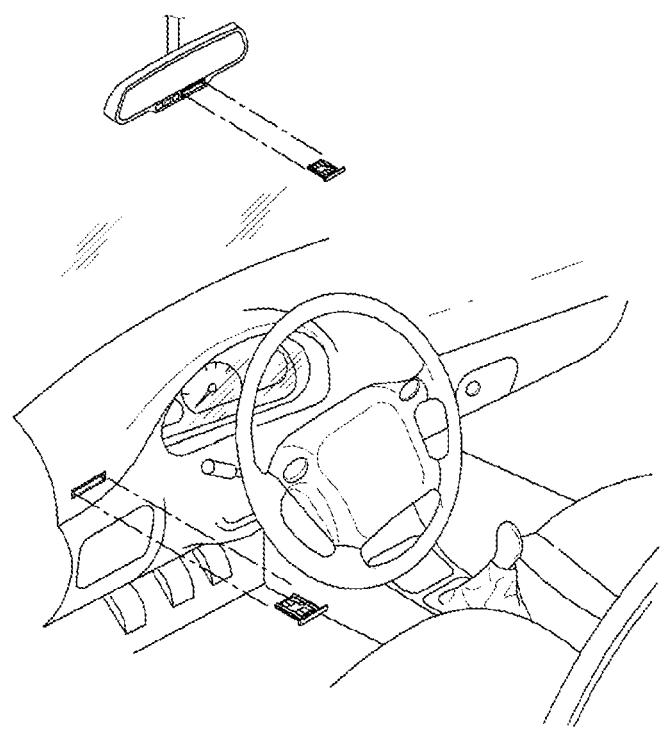
Figure 3C:
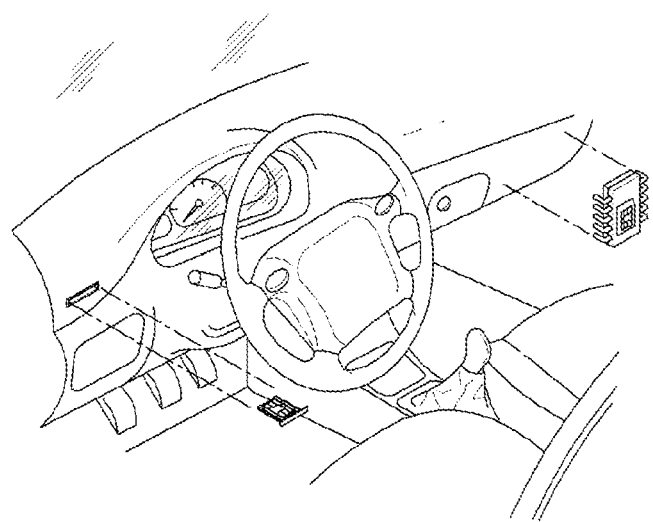

In addition, for example, referring to FIGS. 3a-3c, a plurality of identity devices may be installed in the moving object according to one exemplary embodiment of the present disclosure. For example, referring to FIGS. 3a and 3b, the plurality of identity devices may be installed in the moving object based on respective positions. At this time, for example, the positions at which the plurality of identity devices are installed may be variously set, and the installation positions are not limited to FIGS. 3a and 3b. That is, the plurality of identity devices may be installed in the moving object to perform individual identification and authentication, which will be described below.

In addition, for example, as shown in FIG. 3c, some of the plurality of identity devices may be embedded and some identity devices may be detachably installed. At this time, the embedded identity devices are implemented physically or as a software program (e.g., which can be executed by a processor) in the moving object, as described above. That is, when the plurality of identity devices are applied to the moving object, the identity device may be detachably installed or implemented in the moving object in various ways, without being limited to the above-described embodiment.

For example, each identity device may perform identification and authentication with respect to a user corresponding thereto. More specifically, the moving object may be used by a plurality of users unlike the existing smart devices. At this time, the moving object includes autonomous driving or user-specific functions, which need to be used by identifying each user. In view of the foregoing, the plurality of identity devices may be installed (or implemented) in the moving object. Therefore, the moving object may recognize a plurality of users.

As a more specific example, the moving object may be driven (or may travel) in a state in which the plurality of identity devices are mounted. For example, the moving object may be provided with two identity devices as shown in FIGS. 3a-3c or may be provided with more than two identity devices. In addition, for example, a number of identity devices equal to a number of users who use the moving object may be installed. At this time, in the case of performing initial setting on the moving object, the number of users may be checked and, based on the same, the identity device may be installed in the moving object. For example, while the moving object is used, an identity device may be additionally installed to add a user. As described above, when the plurality of identity devices are installed based on users who use the moving object, it is possible to prevent the moving object from being illegally used or stolen by an unauthorized user.

As another example, as described above, an autonomous driving function or a user-specific function may be set in the moving object. For example, preferred moving object settings may differ between users. in addition, environments in which the moving object is used may differ between users. At this time, in consideration of this, it is necessary to manually change settings in the current moving object. In addition, for example, the autonomous driving function may be set differently for each user. For example, autonomous driving may be set to a full autonomous mode or a partial autonomous driving mode based on the skill of the user. In addition, for example, the autonomous driving mode may be set differently based on the age or driving experience of the user. That is, the autonomous driving mode may be set differently for each user who uses the moving object, without being limited to the above-described embodiment.

As described above, when a plurality of users use the moving object, the moving object needs to be used distinguishably for each user and thus a plurality of identity devices may be provided.

For example, when the moving object is used, the moving object may perform identification and authentication with respect to the user and operate based on the identity device of the user. At this time, for example, the user may be identified and authenticated through a camera included in the moving object. As another example, the user may be identified and authenticated based on fingerprint identification or a separate authentication key. That is, each user may register their fingerprint or may be assigned a separate authentication key (e.g., a password) and then may be identified and authenticated through the fingerprint or the separate authentication key when using the moving object. As another example, identification and authentication of the user may be performed through at least one of fingerprint recognition, iris recognition, facial recognition, moving object head unit input, FOB key, Internet advance reservation, another device, a server or a mobile device. That is, the moving object may identify and authenticate each user, without being limited to the above-described embodiment. At this time, when the moving object identifies and authenticates the user, the moving object may operate based on the identity device corresponding to the identified and authenticated user. For example, the moving object may store and update information on use or driving of the moving object in the identity device based on the user. In addition, for example, setting information for the user may be stored in the identity device. At this time, when the moving object recognizes the user, the setting of the moving object may be changed based on the setting information included in the identity device.

Figure 4:
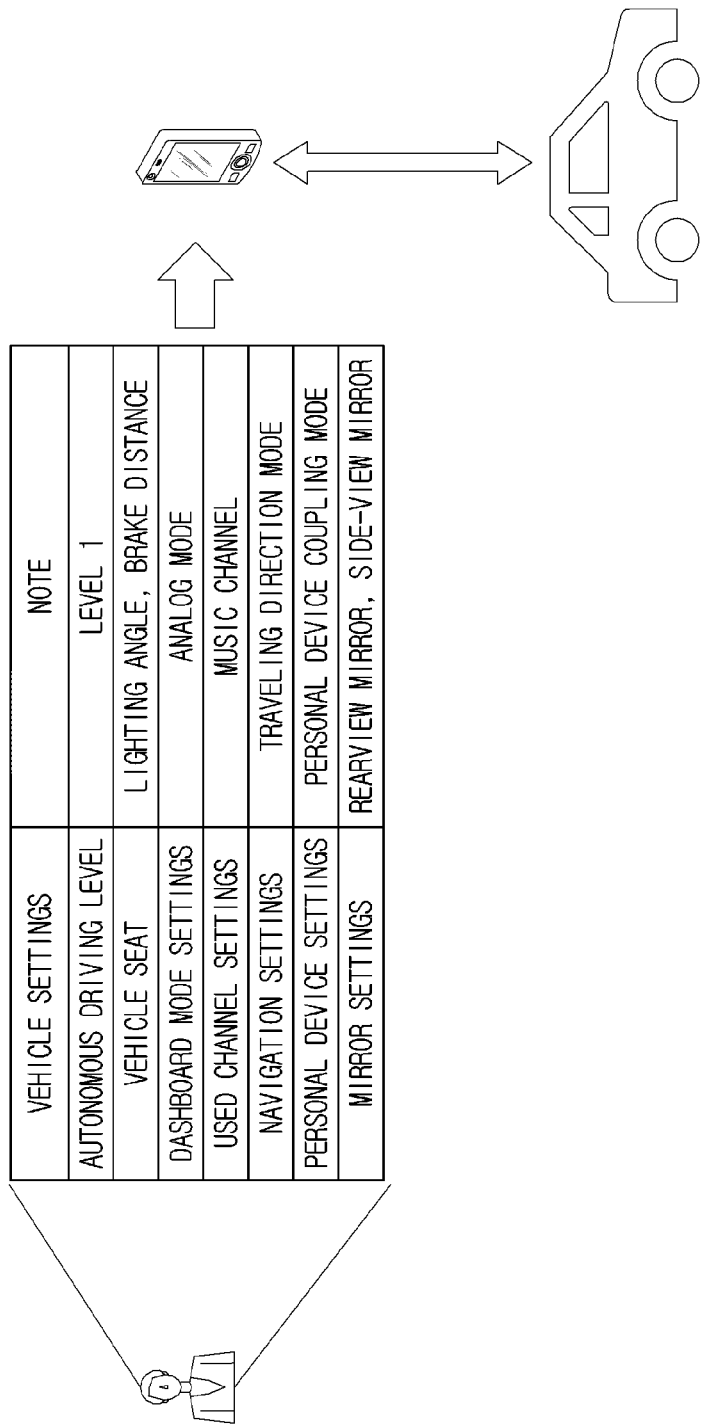
FIG. 4 is a view showing setting information for a user according to one exemplary embodiment of the present disclosure.

FIG. 4 is a view showing setting information of a moving object for each user according to one exemplary embodiment of the present disclosure. Referring to FIG. 4, as described above, the identity device corresponding to each user may store at least one of information on style of each user or user information. At this time, for example, the identity device may include autonomous driving level information, vehicle seat, dashboard mode setting, used channels, navigation settings, personal device settings, mirror settings, etc., as personal style information. However, this is merely an example, without being limited to the above-described embodiment. That is, the identity device may store the personal driving style or user related information and change settings of the moving object when the identity device is recognized. Through this, the settings of the moving object may be customized and provided for each user who uses the moving object. That is, as shown in FIG. 4, the information set for each user may be provided based on the identity device. As a more specific example, various driving environments such as, for example, the position and height of a driver's seat, the color and brightness of interior lightings, the positions and angles of the room and side-view mirrors, an inside temperature control (air conditioner and heater) range, the angle of a steering wheel, tire pressure, the transmission setting mode (normal, eco, power mode, etc.), the wireless communication connection mode (WAVE, cellular, etc.), an autonomous driving function setting variable range (speed and vehicle interval, transverse speed for lane change, acceleration and deceleration, etc.), etc., may be changed and provided according to the driving information set in the identity device of the user.

Specifically, each user may have different settings for driving of the moving object. When each user uses a moving object having settings different from their settings, the number of accidents may increase due to inexperienced driving. Accordingly, by applying the settings of an individual user to the moving object through the identity device, it is possible to increase convenience of use of the moving object.

FIG. 5 is a view showing a method of updating user information at an identity device according to one exemplary embodiment of the present disclosure. As another example, referring to FIG. 5, the above information may be continuously learned based on machine learning. More specifically, personal type information or driver information may be set by the user based on FIG. 4. However, the user may not accurately know the information. That is, the user may not clearly confirm the accurate numerical values and settings of the information. At this time, as an example, the user may conveniently control some of the settings with default settings based on the driving type information while using the moving object. In addition, the user may change the above-described settings in consideration of a specific situation or driving state while traveling. At this time, the user may recognize the above-described change, but may not recognize correct numerical values or values. In view of the foregoing, the identity device may collect driving information or driving type information of the user of the moving object. Thereafter, the identity device may continuously update the setting information customized for the user through machine learning or training. At this time, as described above, the moving object may be used by a plurality of users and the driving information and driving type information may differ between users. Accordingly, the moving object may recognize the identity device corresponding to the individual user and information on the individual user in the identity device. At this time, the identity device may collect related information when the user uses the moving object, and may update the information through machine learning based on the above description. Therefore, the user may own or utilize the unique information of the use of the moving object and increase convenience of using the moving object based on the above description.

In addition, for example, the identity device may transmit the information stored and updated as described above to another device of the user. That is, the user may acquire their driving related information stored in the identity device after performing identification and authentication with respect to their identity device. At this time, the user may use the above-described information when using another moving object. In addition, for example, the user may use the information included in the identity device when the user replaces the moving object or uses a plurality of moving objects, thereby increasing convenience of using the moving object.

Figure 6:
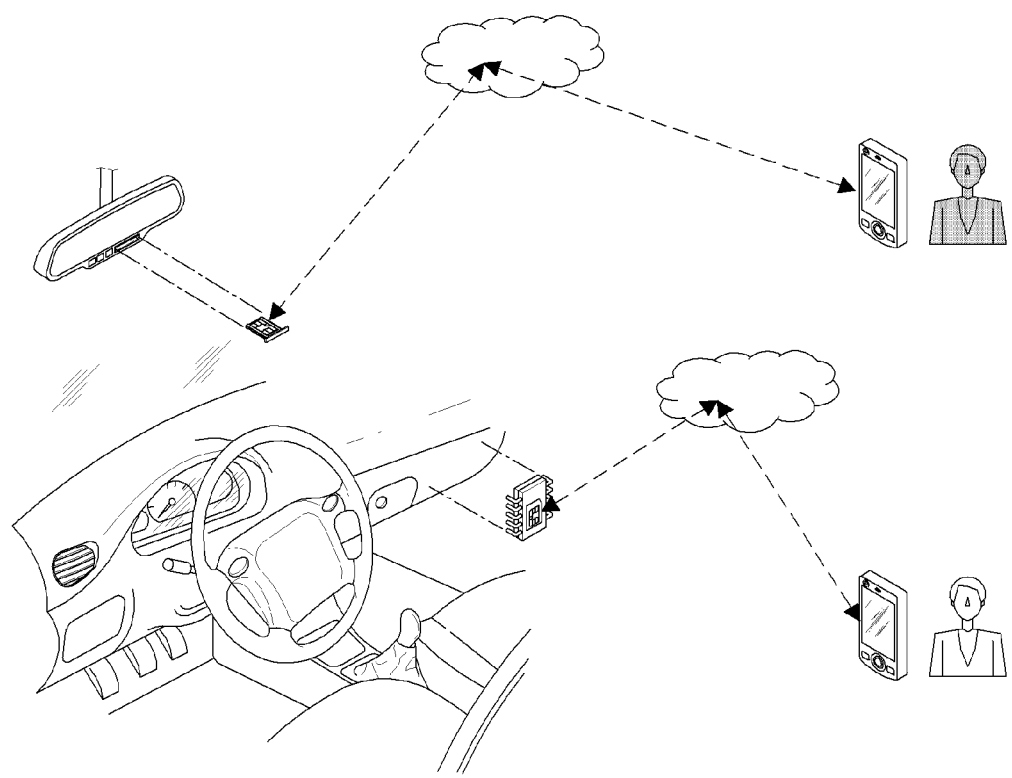
FIG. 6 is a view showing a method of configuring a network based on a plurality of identity devices according to one exemplary embodiment of the present disclosure.

FIG. 6 is a view showing a method of separating control authority based on a plurality of identity devices according to one exemplary embodiment of the present disclosure.

As another example, referring to FIG. 6, control authority for the moving object may be separated based on the plurality of identity devices. More specifically, the moving object may perform authentication with respect to the user based on the identity device and perform communication with an external device based on the same. At this time, the control authority for the moving object may be separated using the plurality of identity devices. For example, control authority related to security and safety of the moving object may need to be given to a specific user or an administrator. In view of the foregoing, a specific identity device of the plurality of identity devices may store control authority information related to security and safety of the moving object and allow access based on identification and authentication. On the other hand, control authority for convenience functions or services of the moving object may be controlled by, e.g., any user of the moving object. At this time, an identity device for the user of the plurality of identity devices may store information on convenience functions or services and allow access of the user of the moving object based on identification and authentication. In view of the foregoing, a plurality of identity devices is installed (or implemented) in the moving object, and the control authority may be separated based on each identity device. For example, referring to FIG. 6, the embedded identity device implemented in the moving object may be used when information related to security or safety of the moving object is changed or communication with an external device is performed based on the related information. At this time, the embedded identity device may be allowed to be accessed by only the owner of the moving object or a specific person. That is, control authority and information related to security and safety of the moving object may be allowed to be accessed by only a specific person based on the embedded identity device. For example, the authority related to the parts located inside the moving object or information related thereto may be controlled based on the embedded identity device. For example, authority for components related to security and safety of the moving object, such as an engine, a transmission, an anti-collision sensor, an airbag sensor, etc. may be controlled by the embedded identity device, which will be described later. In addition, as described above, a plurality of identity devices installed in the moving object may include an identity device related to a convenience function or service. At this time, the installed identity device may control the authority for and information on the service of the moving object such as communication between moving objects and communication with the moving object via another network. For example, communication used by the embedded identity device may be separated from communication used by the installed identity device. That is, each identity device may perform communication with another device via each network, and control operation of the moving object by storing authority and information granted to the identity device. In addition, for example, in the above description, communication with an external device via each network may be performed with different control authorities based on the embedded identity device and the installed identity device. The embedded identity device may be a separately installed identity device. That is, the above description is equally applied to the plurality of installed identity devices, without being limited to the above-described embodiment. In addition, for example, the above-described operation may be performed based on the plurality of embedded identity devices, without being limited to the above-described embodiment.

Figure 7:
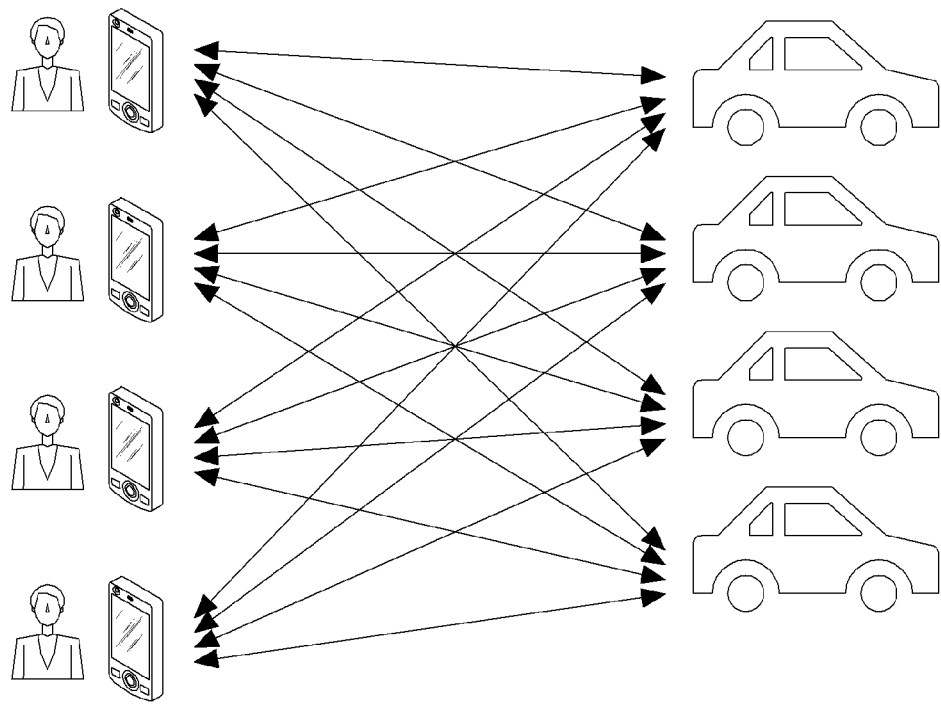
FIG. 7 is a view showing a method of sharing a moving object based on a fleet system according to one exemplary embodiment of the present disclosure.

In addition, for example, the moving object may be shared based on a sharing system. More specifically, FIG. 7 shows a method of providing a moving object sharing service based on a fleet system according to one exemplary embodiment of the present disclosure. At this time, the fleet system may include a plurality of devices and a plurality of moving objects. At this time, each of the plurality of moving objects may have a specific owner. That is, there are owners of the plurality of moving objects, which may be used by other users based on the fleet system. For example, separate owner devices may correspond to the plurality of moving objects, respectively. That is, there is a device corresponding to the owner of each moving object. On the other hand, for example, there are respective devices for users, other than the owner, who use the respective moving objects. At this time, the users may use the moving objects based on the respective devices. Hereinafter, for convenience of description, the device for the owner is referred to as an owner device and the device for the user other than the owner is referred to as a renter device. However, this is merely one exemplary embodiment for convenience of description, without being limited to the above-described embodiment. For example, the owner device and the renter device may be smart devices. In addition, the owner device and the renter device may be carried by a person, for example, a smart watch or other accessories. As another example, each of the owner device and the renter device may be the above-described identity device, which will be described later.

In addition, for example, referring to FIG. 7, the above-described moving objects and devices may be always connected via a network based on the fleet system. More specifically, in the fleet system, a specific moving object may be always connected to the device of the owner of the moving object. For example, a service may be provided through the fleet system only in a state in which the moving object is connected to the device of the owner of the moving object, without being limited to the above-described embodiment. In addition, for example, the plurality of moving objects in the fleet system and the devices of the renters who may use the moving objects may be always connected via the network. That is, the renters may confirm information on the moving object provided based on the fleet system through their devices in real time and perform operation for a service using the moving object based on the same.

As another example, the moving object and the device connected to each other based on the fleet system may be limited to the moving object and the device included in a specific group. For example, a large number of moving objects and devices may be registered in the fleet system. At this time, only when the moving object and the device registered in the fleet system are connected to each other, unnecessary overhead may occur and the service may not be smoothly provided. In view of the foregoing, the fleet system may provide connection for the moving objects and the devices included in a specific group. That is, the fleet system may manage the service provided based on groups capable of interconnection. The moving object and the device of the owner of the moving object may be connected to the device of the renter in a group to which the moving object and the device of the owner of the moving object belongs. In addition, the renter device may be always connected to the moving object in the group to which the renter belongs, thereby confirming the state of the moving object in real time and determine whether the moving object is available. That is, as described above, the plurality of devices and the plurality of moving objects may be connected to each other. Hereinafter, a method of recognizing a moving object to be used by a renter based on the above-described situation and using the moving object based on the same will be described. As another example, a road-side unit (RSU) may be a device capable of communication. In addition, for example, the RSU may refer to a structure installed in a building or an area to exchange a signal, without being limited to the above-described embodiment. Hereinafter, for convenience of description, the RSU will be described and may include various structures or devices, without being limited to the above-described embodiment.

In addition, for example, the RSU may refer to a communication device disposed on a road at a certain distance or periodically. In addition, for example, the RSU may be disposed at a specific point on the road to perform communication with the moving object. As another example, the RSU may refer to a terminal capable of communication as a traffic infrastructure. As another example, the RSU may refer to a terminal capable of communication, such as a V2X terminal, a surrounding moving object or the other moving object. That is, the RSU refers to a device capable of performing communication with the moving object around the moving object, which hereinafter are referred to as the RSU, for convenience of description.

In addition, for example, the moving object provided in the fleet system may be a shared moving object. For example, the moving object shared through an individual may be provided by a system or a provider. That is, the moving object may not be owned by an individual but may be shared by many users through a system, without being limited to the above-described embodiment.

In addition, the fleet system may refer to a system in which the moving object is shared in a certain area. At this time, the certain area may include a local concept such as an apartment complex or a working area. For example, the certain area may include an area within an apartment complex and an area spaced apart from the apartment complex by a predetermined distance. As another example, the certain area may mean an area spaced apart from the working area by a predetermined distance. As another example, the area, to which the fleet system is applied, is a relatively large area such as an administrative district or a city unit, without being limited to the above-described embodiment. That is, the certain area may mean a reference range in which operation based on the fleet system is possible, and may be changed by the user or by the system. In addition, for example, the fleet system may refer to a system in which the moving object is shared between users authenticated as specific users (or devices). For example, the specific users may be apartment residents which may receive the service of the fleet system. For example, the fleet system may provide a moving object sharing service based on a device registered by an apartment resident. Therefore, the sharing service may be provided to specific objects, and security and management efficiency of the moving object may be improved. However, a specific user who uses the shared moving object in the fleet system may be determined based on other methods, without being limited to the above-described embodiment. A shared moving object fleet system may be provided with a shared moving object. At this time, the shared moving object may refer to a moving object authenticated and authorized to be shared by the system. For example, the shared moving object may be a moving object registered in the fleet system. At this time, the fleet system administrator may provide the shared moving object for the fleet system. That is, only the moving object authenticated or authorized by the fleet system administrator may be used as the shared moving object. Therefore, it is possible to prevent accidents from occurring by security or management of the shared moving object in the fleet system. More specifically, the moving object to be shared may be registered in the fleet system. The authority to register the shared moving object in the fleet system may be restricted by the fleet system. At this time, the moving object which may be registered in the fleet system may have the same ID or the same identification information. In addition, the fleet system may provide the shared moving object and thus manage the shared moving object. For example, management of the shared moving object may include managing information necessary to provide the shared moving object service, such as residual oil information, the moving object status information or the moving object driving information of the moving object registered in the fleet system. At this time, the fleet system may check the status of the shared moving object in real time, control usage authority or transmit a repairing command to a moving object in which a problem occurs through the system, and provide a service based on the same.

As another example, the fleet system may provide a service to not only a moving object privately owned by an individual but also a shared moving object provided by the system, as described above. For example, the fleet system may set identification information for identifying the shared moving object provided by the system and the moving object owned by the individual. At this time, a privately owned moving object indicating field may be present. When the privately owned moving object indicating field has a value of 0, the shared moving object may refer to a moving object provided by a system provider without private ownership. When the privately owned moving object indicating field has a value of 1, this may indicate that the moving object is privately owned and is provided to the fleet system as the shared moving object, as shown in Table 1 below. That is, a mixture of the privately owned moving object and the shared moving object provided by the system may be considered. At this time, for example, the service provided by the fleet system may vary based on a moving object type indication field. For example, in the case of the moving object provided by the fleet system, there is no usage restriction for the user who uses the moving object. In contrast, in the case of the privately shared moving object, there may be usage restriction. As another example, in the case of the moving object provided by the fleet system and the privately shared moving object, services may be provided based on different charging systems, without being limited to the above-described embodiment.

TABLE 1

| Moving object type indication field | Indication information |
|---|---|
| 0 | Moving object provided by the fleet system |
| 1 | Privately shared moving object |

As another example, in detailed operation of the fleet system, a service may be provided based on the device registered in the fleet system.

More specifically, the device registered in the fleet system may acquire information on the shared moving object after the authentication and security procedure with the system. That is, the information on the shared moving object may be provided to the device. At this time, the device may contact the moving object to be used based on the information on the shared moving object.

For example, there may be a registered moving object and a registered device (or user) in the fleet system. At this time, the moving object registered in the fleet system may be a privately owned moving object as described above. For example, when the privately owned moving object is registered in the fleet system, the fleet system may provide information on an incentive in consideration of a situation in which the privately owned moving object is rented out to another person. For example, the fleet system may determine incentive information based on at least one of the type, status, model, or rental time of a personal moving object. That is, the fleet system may determine the incentive information of the personal moving object provided to the renter and provide the incentive information to the owner of the personal moving object. For example, the owner of the personal moving object may receive a certain reward from the fleet system based on the incentive information. In addition, for example, the incentive information may be used as information for using the fleet system, without being limited to the above-described embodiment.

In addition, for example, only certain moving objects and devices may be registered in the fleet system based on authentication and authorization. At this time, the fleet system may be operated based on the status information of the registered moving objects and the registered devices. For example, the fleet system may confirm the information on a currently used moving object and an individual moving object in real time. At this time, for example, each moving object may periodically transmit the information thereof to the fleet system. In addition, for example, each moving object may transmit the information thereof to the fleet system based on an event trigger. For example, when an event in which the position of the moving object is changed or usage of the moving object is changed is triggered, the moving object may transmit the information thereof to the fleet system (or the server). In addition, the fleet system (or the server) may confirm the information on the registered device in real time. At this time, for example, the registered device may not always use the service of the fleet system. Accordingly, activation information indicating whether the registered device uses the service of the fleet system may be necessary. At this time, for example, the fleet system may include list information of the registered device. A device, which is currently using the moving object or activates the system to use the moving object, of the registered devices included in the list of the fleet system may be provided along with the list information. As another example, a registered device (deactivated device) which does not use the fleet system, a registered device (activated device) which is using the moving object of the fleet system and a registered device (temporary device) which wants to use the moving object may be distinguishably displayed. That is, information indicating whether the moving object is actually being used, whether to intend to use the moving object or whether the moving object is not yet used although there is an intention of use may be provided. In addition, for example, use status information may be further indicated with respect to the device which is using the moving object of the fleet system. For example, the use status information may further include estimated use time information or use position information.

More specifically, the fleet system may include list information of a plurality of registered moving object and a plurality of devices. At this time, the list information may include at least one of use status information, device position information or moving object position information. At this time, the fleet system may provide a moving object sharing service based on the device position information and the moving object position information. In addition, the use status information may include at least one of information on a moving object which is being used, estimated time information of the moving object which is being used, device-moving object matching information, deactivated device information, activated device information, deactivated moving object information or activated moving object information. At this time, for example, the use status information may further include information on a moving object which is currently being used by another device and estimated time information of the moving object which is being used. In addition, the use status information may further include device-moving object matching information based on information on the list form. In addition, the use status information may include activated device information and deactivated device information. For example, the activated device information may be information on a device which is currently preparing to use the moving object among the devices registered in the fleet system. For example, the activated device may mean a device which has executed a program or application for the fleet system. Meanwhile, the deactivated device may be a device which is registered in the fleet system but does not use moving object sharing. For example, the deactivated device may be a device which does not execute or deactivates the program or application for the fleet system.

In addition, the fleet system may include activated moving object information and deactivated moving object information. At this time, for example, the fleet system may include the status information of a plurality of moving objects. At this time, the status information of the moving object may be information on the moving object, such as information on whether the moving object is normal or abnormal, residual traveling distance information or gas filling time information. That is, the status information of the moving object may refer to information for determining whether the moving object is capable of being provided for moving object sharing, without being limited to the above-described embodiment. At this time, the fleet system may determine whether the moving object is activated based on the status information. For example, the fleet system may provide information on the activated moving object with respect to a moving object without abnormality and having a sufficient amount of gas. In contrast, the fleet system may classify a moving object having an abnormal status as the deactivated moving object. At this time, the fleet system may provide the information on the deactivated moving object to an associated system or server. For example, the associated system or server may repair or manage the deactivated moving object, without being limited to the above-described embodiment.

Figure 8:
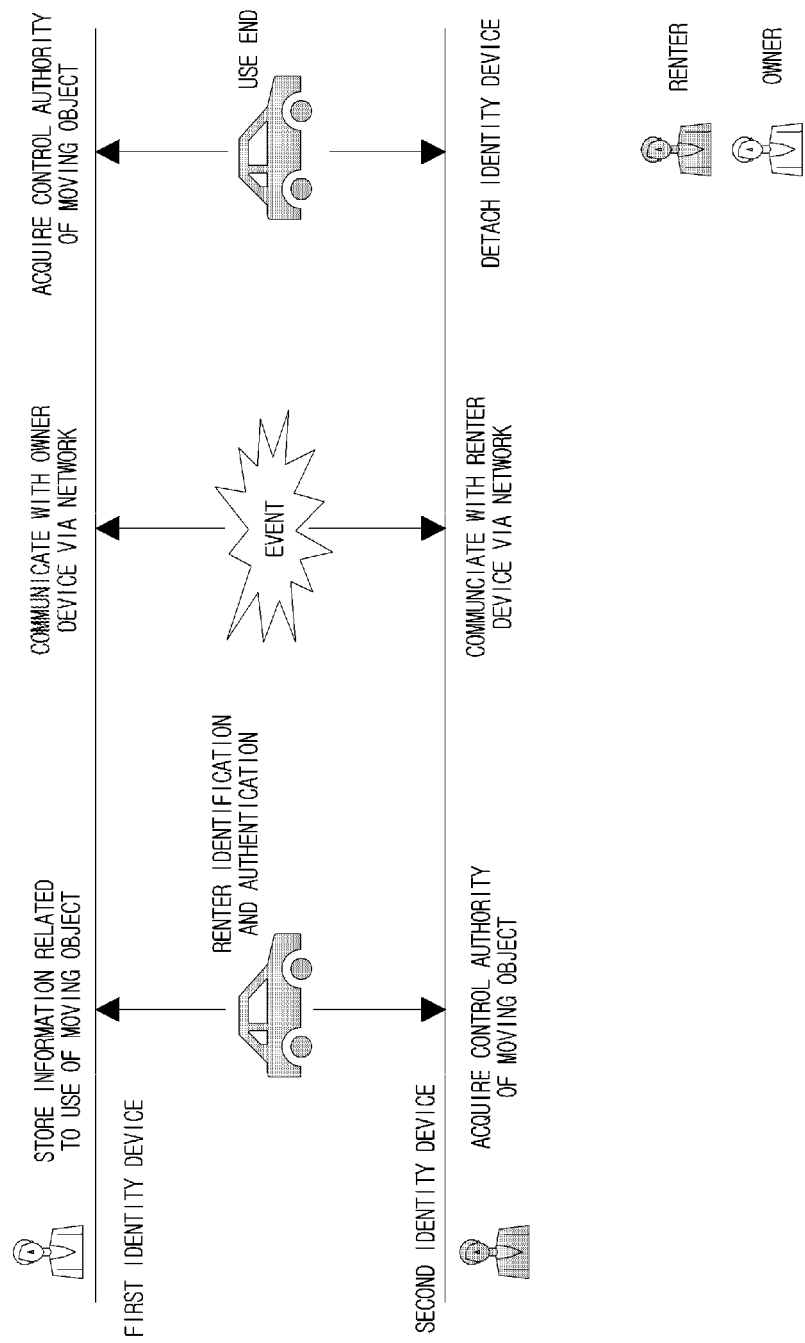
FIG. 8 is a view showing a method of using a plurality of identity devices in a fleet system according to one exemplary embodiment of the present disclosure.

FIG. 8 is a view showing a method of using a plurality of identity devices in a fleet system according to one exemplary embodiment of the present disclosure. For example, as described above, a moving object sharing service may be provided based on the fleet system. At this time, for example, the moving object sharing service may be provided based on a plurality of identity devices. As a detailed example, referring to FIG. 8, the moving object may be shared through the fleet system operating based on a subject vehicle. More specifically, the moving object may have a moving object owner, and, when the moving object owner does not use the moving object, the moving object owner may share the moving object with another user. At this time, for example, hereinafter, for convenience of description, another user who uses the moving object is referred to as a renter, without being limited thereto. For example, as described above, the renter may use the moving object of the owner based on a certain condition, as described above.

At this time, for example, when the moving object is shared, authentication for moving object sharing may be necessary. In view of the foregoing, the moving object sharing system may operate based on the plurality of identity devices. For example, a plurality of identity devices may be installed (or implemented) in the moving object. At this time, for example, any one of the plurality of identity devices may be an identity device for the moving object owner. At this time, for example, the identity device for the moving object owner may be independently installed in the moving object. As another example, the moving object owner may be changed only a special case such as moving object trading and may not be easily changed. In view of the foregoing, the identity device for the moving object owner may be an embedded identity device. At this time, for example, the embedded identity device may be implemented in the moving object in hardware or software, without being limited to the above-described embodiment. That is, in the fleet system, the moving object may recognize the identity device for the moving object owner. At this time, identification and authentication of the moving object owner may be performed based on the identity device for the moving object owner. For example, the identity device for the moving object owner may perform identification and authentication of the owner. At this time, when identification and authentication are completed, the moving object may be controlled by the moving object owner. At this time, for example, the owner may be identified and authenticated through the camera included in the moving object. As another example, the owner may be identified and authenticated based on fingerprint recognition or a separate authentication key. That is, the owner may register their fingerprint or may be assigned a separate authentication key (e.g., a password) and then may be identified and authenticated through the fingerprint or the separate authentication key when using the moving object. As another example, identification and authentication of the owner may be performed through at least one of fingerprint recognition, iris recognition, facial recognition, moving object head unit input, FOB key, Internet advance reservation, another device, a server or a mobile device. That is, as described above, the identity device for the owner may be installed in the moving object and the identity device may identify and authenticate the owner. In addition, for example, the identity device may include setting information for the owner and the setting information may be equal to that shown in FIG. 4.

For example, an identity device for a renter may be installed in the moving object. More specifically, when the moving object is shared with the renter, the moving object needs to recognize the renter. For example, when the renter is not properly recognized in the moving object sharing system, the moving object may be vulnerable to security. In addition, when an accident or a problem occurs in the moving object, it may be difficult to manage history information. In view of the foregoing, the renter may use the identity device in order to share the moving object. That is, when the identity device for the renter is installed and recognized in the moving object, the moving object may give control authority to the renter. That is, the renter may install the identity device in the moving object and then use the moving object when identification and authentication are performed. At this time, for example, the identification and authentication of the renter may be performed through the camera included in the moving object, as described above. As another example, the renter may be identified and authenticated through fingerprint recognition or a separate authentication key. That is, the renter may register their fingerprint or may be assigned a separate authentication key (e.g., a password) and then may be identified and authenticated through the fingerprint or the separate authentication key when using the moving object. As another example, identification and authentication of the renter may be performed through at least one of fingerprint recognition, iris recognition, facial recognition, moving object head unit input, FOB key, Internet advance reservation, another device, a server or a mobile device.

At this time, for example, information related to identification and authentication of the renter may be provided based on the owner device or the fleet system. That is, when the renter wants to share the moving object, the renter may install the identity device thereof in the moving object. Thereafter, when the moving object recognizes the identity device, the renter may finally perform identification and authentication based on the identification and authentication related information received from the fleet system or the owner device. Meanwhile, for example, the identity device for the renter may include setting information for the renter. At this time, for example, the setting information may be equal to that shown in FIG. 4. For example, when the moving object completes identification and authentication of the renter based on the identity device, the setting information of the moving object may be changed based on the setting information included in the identity device for the renter. That is, the setting information of the moving object may be changed to setting suiting the renter based on the identity device of the renter. In addition, for example, the moving object driving record or operation record for the renter may be recorded and stored in the identity device for the renter. More specifically, when the renter uses the shared moving object, it is necessary to record or store the driving information or operation information for the renter. In view of the foregoing, the driving or operation information for the renter may be stored in the identity device for the renter. That is, the information on the case where the moving object is used may be stored in the identity device for the renter. At this time, for example, the above-described information may be used when the renter uses another moving object, which will be described later.

In addition, for example, the identity device for the renter may perform communication with a renter device via a network. In addition, for example, the identity device for the owner may perform communication with an owner device via a network. At this time, the renter device and the owner device may include a smart watch, a smartphone, etc., without being limited to the above-described embodiment. For example, both the identity device for the owner and the identity device for the renter may be installed in the moving object, as described above. For example, when the moving object is not shared, the identity device for the owner may be installed (or implemented) in the moving object. In contrast, when the moving object is shared by the renter, not only the identity device for the owner but also the identity device for the renter may be installed (or implemented) in the moving object.

As a detailed example, referring to FIG. 8, a first identity device may be an identity device for an owner. At this time, for example, as described above, the first identity device may be an embedded identity device or an installed identity device, without being limited to the above-described embodiment. As a detailed example, the first identity device may be an e-SIM as an embedded identity device. In addition, for example, the first identity device may be an installed SIM as an installed identity device, without being limited to the above-described embodiment. In addition, a second identity device may be an identity device for a renter. At this time, for example, the identity device for the renter may be an installed identity device, without being limited to the above-described embodiment. As a detailed example, the second identity device may be an e-SIM as an embedded identity device. In addition, for example, the second identity device may be an installed SIM as an installed identity device, without being limited to the above-described embodiment.

As another example, the first identity device may be a nano identity device. As a detailed example, the first identity device may be a nano SIM. For example, the first identity device may be an identity device formed of a set of non-unit components. At this time, the first identity device may be a nano identity device as a nano unit in consideration of a device identified in the moving object, without being limited to the above-described embodiment.

In addition, for example, the second identity device may also be a nano identity device. As a detailed example, the second identity device may be a nano SIM. For example, the second identity device may be an identity device formed of a set of non-unit components. At this time, the second identity device may be a nano identity device as a nano unit in consideration of a device identified in the moving object, without being limited to the above-described embodiment.

That is, the first identity device and the second identity device may be identity devices having various forms, and the foils are not limited. Hereinafter, these are referred to as the first identity device and the second identity device, for convenience of description, and the forms thereof may be variously applied based on the above description.

As described above, when the moving object may recognize the identity device for the renter and perform identification and authentication with respect to the renter, the control authority of the moving object may be provided to the renter based on the second identity device. That is, the renter may use the shared moving object based on the second identity device. At this time, for example, use of the moving object may be restricted. In addition, for example, it may be necessary to monitor use of the moving object. In view of the foregoing, the moving object may store moving object use related information based on the first identity device. That is, the moving object owner may confirm information on use of the moving object based on the first identity device. For example, the moving object owner may confirm the information on use of the moving object based on the first identity device through the device thereof in real time. In addition, for example, the moving object owner may confirm the information on use of the moving object stored in the first identity device later, without being limited to the above-described embodiment.

In addition, for example, an event occurring while the moving object is used may be reported to the moving object owner device and the renter device based on the respective identity devices. At this time, for example, the event may be an accident occurring in the moving object. In addition, for example, use of the moving object may end or additional conditions may be set in the moving object. In addition, for example, the moving object may violate a predetermined condition or a restriction. That is, the event may be generated and detected in the moving object, and the event type is not limited.

At this time, when the moving object detects an event, the moving object may perform communication with the owner device via the network based on the first identity device. That is, the moving object may transmit information on the event to the owner device. Therefore, the moving object owner may determine whether there is no problem in use of the moving object when the moving object is used. In addition, for example, when the moving object detects an event, the moving object may perform communication with the renter device via the network based on the second identity device. That is, the moving object may also transmit the information on the event to the renter device. Therefore, the renter may also manage the history of the event, without being limited to the above-described embodiment.

Thereafter, when the renter ends use of the moving object, the identity device for the renter may be detached from the moving object. For example, detachment of the identity device for the renter may be performed when the moving object is turned off. As another example, detachment of the identity device for the renter may be performed after additional authentication is performed in the moving object. For example, when the renter ends use of the moving object, the moving object may transmit information on sharing end to the owner. At this time, the moving object may provide use end information to the owner device based on the first identity device. At this time, the moving object owner may perform authentication or authorization for use end based on the received information. For example, the owner device may perform authentication or authorization when the moving object is located in a predetermined area or the moving object does not have abnormality. When the owner performs authentication or authorization with respect to use end as described above, the identity device for the renter may be detached from the moving object.

In addition, for example, the first identity device may directly perform authentication or authorization. For example, the first identity device may directly determine whether the moving object is located in the predetermined area or the moving object does not have abnormality, and directly perform authentication or authorization with respect to use end of the renter.

That is, normality/abnormality in use of the moving object by the renter may be determined based at least one of the first identity device or the device (owner device) corresponding to the first identity device, without being limited to the above-described embodiment.

At this time, the control authority of the moving object may be transferred to the moving object owner based on the first identity device, without being limited to the above-described embodiment.

As another example, when the second identity device is recognized in the moving object, the control authority of the moving object may be provided to the user corresponding to the second identity device. At this time, for example, the second identity device may be detached from the moving object.

More specifically, the control authority of the moving object may be transferred when the second identity device is recognized, and the transferred state may be maintained regardless of whether the second identity device is installed. At this time, for example, setting information for the user (or the renter) corresponding to the second identity device may not be stored in the second identity device. In addition, for example, the setting information for the user corresponding to the second identity device may be stored in at least one of the first identity device or the moving object, without being limited thereto. That is, the second identity device is used for renter authentication and, thereafter, authentication identification may be maintained.

At this time, for example, when the user (or the renter) corresponding to the second identity device ends use of the moving object, the second identity device may be re-recognized in the moving object. For example, the second identity device may be re-installed in the moving object. At this time, when the moving object recognizes the second identity device, the moving object may stop use with respect to the user corresponding to the second identity device. At this time, the moving object may re-transfer the control authority of the moving object to the user (owner) corresponding to the first identity device. That is, the renter may use the second identity device as an authentication and identification unit for sharing of the moving object, without maintaining the installed state. As another example, the second identity device may not be installed in the moving object. For example, the second identity device may perform short-range signal exchange with the moving object via NFC, Bluetooth and the other short-range communication network and perform authentication and identification operation. Therefore, the moving object may provide the control authority of the moving object to the user corresponding to the second identity device. Meanwhile, when the renter ends use of the moving object, the renter may enable the second identity device to be re-recognized in the moving object. That is, the second identity device may be re-recognized by performing short-range signal exchange with the moving object via at least one of NFC, Bluetooth or the other short-range communication network in a state in which the control authority of the moving object is transferred. Therefore, the second identity device may end use of the moving object and re-transfer the control authority, without being limited to the above-described embodiment.

FIG. 9 is a view showing a method of updating user information at an identity device according to one exemplary embodiment of the present disclosure. As another example, Referring to FIG. 9, information on use of the moving object may be continuously learned based on machine learning, as described above. At this time, for example, the information on use of the moving object may be stored and updated based on the identity device with respect to the owner and the renter. That is, the moving object may be used by a plurality of users and the driving information and driving type information of the users may be different from one another. Accordingly, the moving object may recognize the identity device corresponding to an individual user and store information on the individual user in the identity device. At this time, the identity device may collect related information when the user uses the moving object, and update may be performed through machine learning as described above. Therefore, it is possible to own and utilize unique information on use of the moving object by the owner and the renter and increase convenience of use of the moving object.

In addition, for example, the identity device may transmit the stored and updated information to another device of the user as described above. At this time, it is possible to increase convenience of user when the renter uses the shared moving object.

Figure 10:
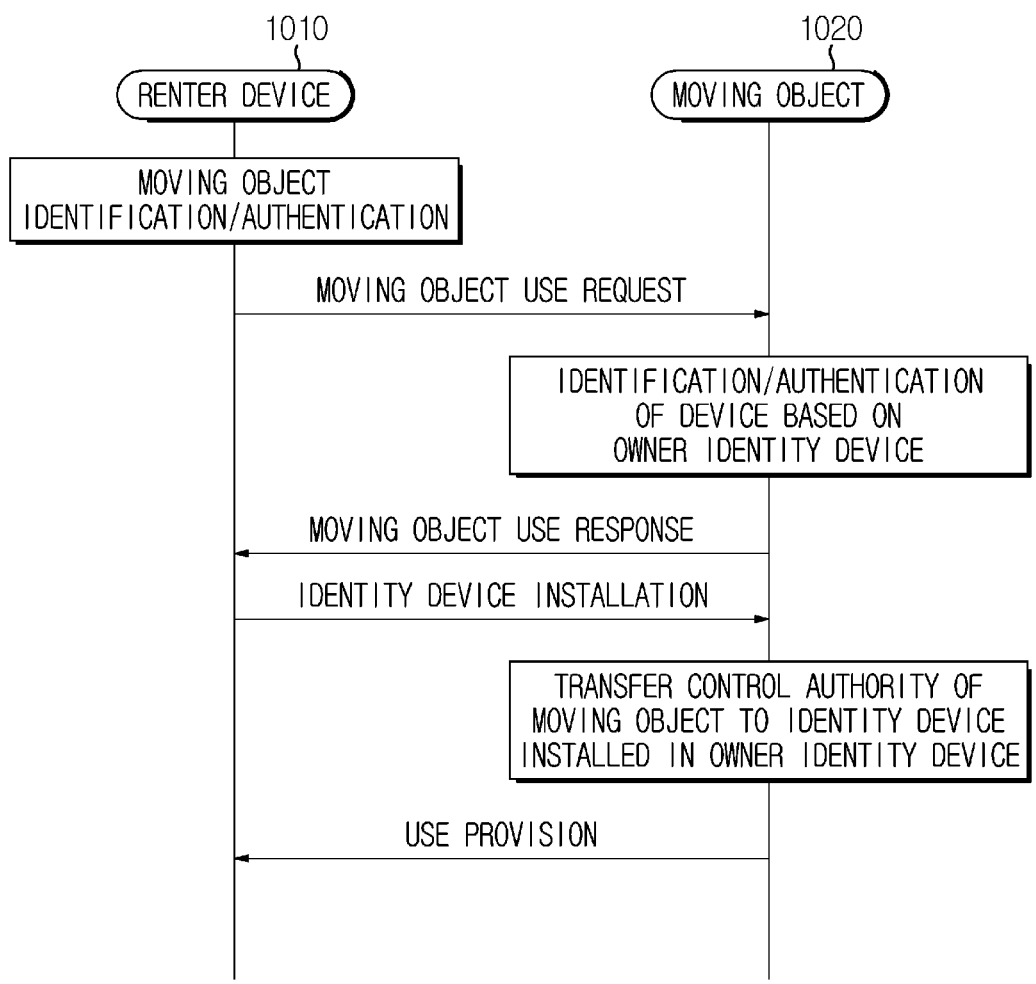
FIG. 10 is a view showing a method of performing identification and authentication with respect to a moving object based on a plurality of identity devices according to one exemplary embodiment of the present disclosure.

FIG. 10 is a view showing a method of performing identification and authentication of a moving object based on a plurality of identity devices according to one exemplary embodiment of the present disclosure. Referring to FIG. 10, as described above, the identity device for the moving object owner and the identity device for the renter may be installed (or provided) in the moving object. At this time, for example, FIG. 10 shows an operation method when the identity device for the moving object owner is an embedded identity device and the identity device for the renter may be an installed identity device. However, for example, both the identity devices may be installed identity devices or embedded identity devices, without being limited to the above-described embodiment.

For example, when the renter wants to use the moving object, a renter device 1010 may perform identification and authentication of a moving object 1020. At this time, the renter device 1010 may be a smartphone or a smart watch, without being limited to the above-described embodiment. For example, the renter device 1010 may perform identification and authentication of the moving object 1020 and then transmit a use request to the moving object 1020. At this time, for example, the renter device 1010 may perform identification and authentication of the moving object 1020 to be used based on the fleet system. That is, the renter may select the moving object 1020 to be used and transmit a request for using the moving object 1020. At this time, the moving object 1020 may perform identification and authentication of the renter device 1010 based on the identity device of the owner. For example, the moving object 1020 may transmit information on the renter device 1010 to the owner device based on the identity device of the owner, and perform identification and authentication based on the same. That is, the identity device of the owner installed in the moving object 1020 may perform identification and authentication of the renter device 1010. Thereafter, the moving object 1020 may transmit information processed based on the owner identity device to the renter device 1010 as moving object use response information. At this time, when use of the moving object is allowed, the renter may install the identity device in the moving object 1020. That is, when use of the moving object is allowed, the renter may install the identity device of the renter in the moving object 1020. When the identity device of the renter is installed in the moving object 1020, the control authority of the moving object 1020 is transferred from the identity device of the owner to the identity device of the renter. Thereafter, use of the moving object 1020 may be provided to the renter and the moving object sharing service may be provided based on the above description.

Figure 11:
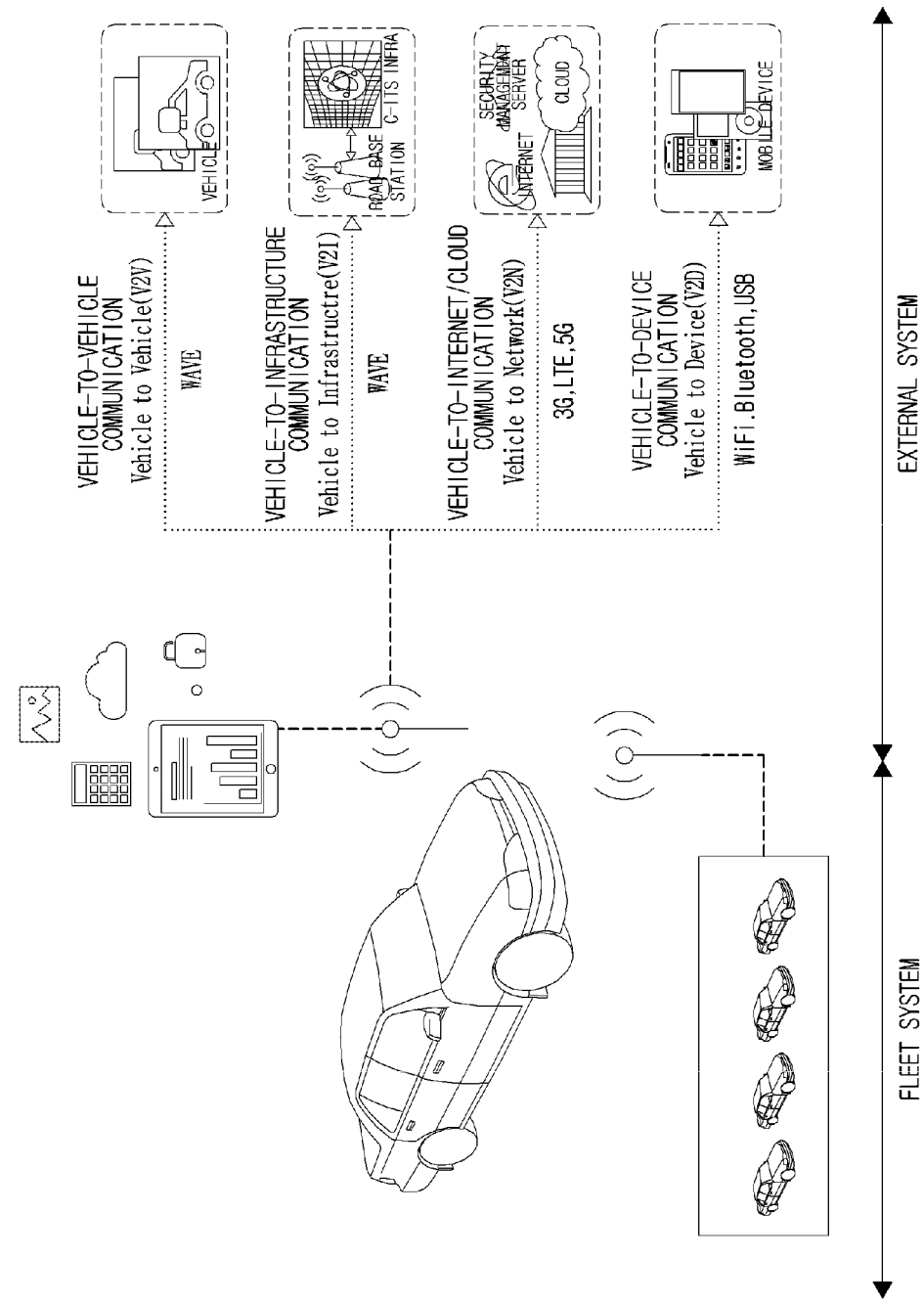
FIG. 11 is a view showing a method of providing a moving object sharing service based on a shared moving object provided by a system according to one exemplary embodiment of the present disclosure.

FIG. 11 is a view showing a method of providing a moving object sharing service based on a shared moving object provided in a system according to one exemplary embodiment of the present disclosure. Referring to FIG. 11, as described above, in a fleet system, the moving object may be provided through the system or an administrator. That is, there is a separate owner of each moving object, which is not provided to the renter, and the moving object sharing system may operate based on the moving object supplied by the system or the administrator. At this time, for example, the moving object may be managed by the fleet system or a provider. That is, the fleet system may supply a plurality of moving objects and control the plurality of moving objects to provide a sharing service. At this time, since the moving object may be supplied by the system without a separate owner, it may be necessary to manage and control the moving object. That is, the fleet system may manage the supplied moving object. In view of the foregoing, an identity device for the fleet system may be installed (or implemented) in the moving object. That is, both the identity device based on the user and the identity device for the fleet system may be installed (or implemented) in the moving object, in order to use an external system or an existing communication network. At this time, the identity device for the fleet system may be implemented in the moving object in the form of the embedded identity device. In addition, for example, the identity device for the fleet system may be installed in the moving object in the form of the installed identity device, without being limited to the above-described embodiment. At this time, for example, the moving object may perform communication with at least one of another moving object in the fleet system and a server based on the identity device for the fleet system. In addition, for example, the fleet system may recognize the moving object supplied in the system based on the identity device. That is, the identity device may be an identity device dedicated to the fleet system. At this time, the identity device for the fleet system may include unique ID information for the fleet system. More specifically, the identity device installed (or implemented) in the moving object included in the same fleet system may include the same fleet system ID information. In addition, for example, the identity device may include ID information for the individual moving object. That is, the moving objects the fleet system may confirm that the moving objects are present in the same fleet system via the identity devices and operate based on the individual IDs. When the fleet system operate, the fleet system may manage and control the individual moving objects provided in the fleet system. For example, the moving objects in the same fleet system may perform communication via a dedicated network based on the identity device for the fleet system. Therefore, the fleet system may check the position of the moving object and perform additional measure for providing the sharing service. That is, the moving object sharing service may be provided based on the identity device dedicated to the fleet system.

The Individual identity device may be installed (or implemented) in the moving object supplied by the fleet system. At this time, for example, the identity device may be installed and used by the renter who uses the moving object. At this time, the function of the renter identity device has been described above.

As another example, the identity device considering the moving object service or convenience function may be installed in the moving object supplied by the fleet system. At this time, the identity device may perform communication with other devices via existing communication networks such as vehicle-to-vehicle communication. Therefore, it is possible to provide the service or convenience function to the moving object.

That is, a plurality of identity devices may be installed (or implemented) in the moving object supplied by the fleet system, as an identity device dedicated to the fleet system and an identity device for using the moving object. Therefore, the moving objects may be smoothly shared in the fleet system. In addition, it is possible to provide various services and convenience functions in the same manner as the existing moving object, without being limited to the above-described embodiment.

Figure 12:
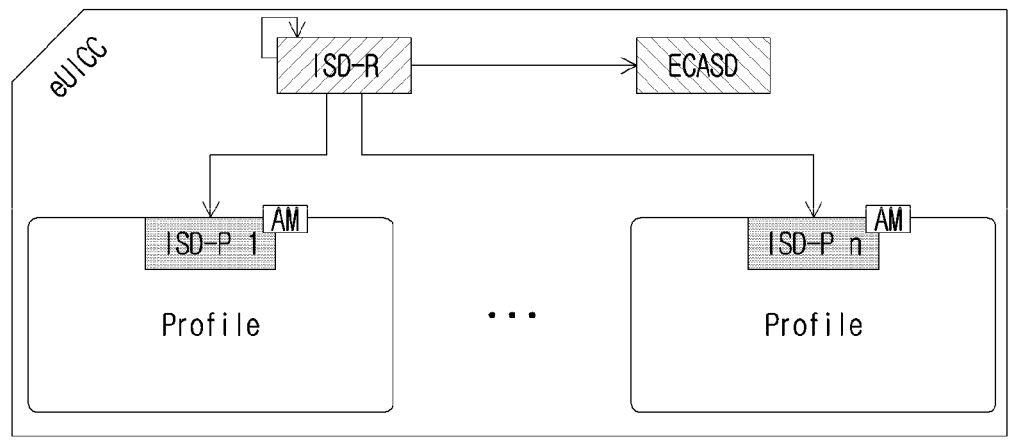
FIG. 12 is a view showing an embedded identify device according to one exemplary embodiment of the present disclosure.

FIG. 12 is a view showing an operation method based on an embedded identity device according to one exemplary embodiment of the present disclosure. For example, as described above, the embedded identity device or the identity device may store profile information as shown in FIG. 12. At this time, for example, the profile information may be user related information or information stored for use of the moving object. At this time, for example, in consideration of security of the moving object and supplement of the identity device, a component accessible to the profile and a component for performing authentication with the moving object may be distinguished. That is, the component accessible to the profile in the embedded identity device may acquire information on control of the moving object from the profile and transmit the information to the component for performing authentication with the moving object. In addition, for example, operation based on a component other than the component disclosed in FIG. 12 is possible, without being limited to the above-described embodiment.

Figure 13:
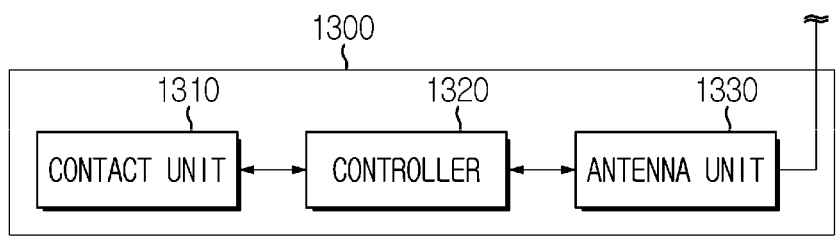
FIG. 13 is a view showing the configuration of an identity device according to one exemplary embodiment of the present disclosure.

FIG. 13 is a view showing an identity device according to one exemplary embodiment of the present disclosure. Referring to FIG. 13, an identity device 1300 may include a contact unit 1310 which may be brought into contact with a moving object or another device for recognition. In addition, for example, the identity device 1300 may include a controller 1320 for controlling and managing operation based on the identity device 1300. In addition, the identity device 1300 may include an antenna unit 1330 (e.g., antenna(s), receiver(s), transmitter(s), transceiver(s), etc.) for performing communication with another device and exchanging data. At this time, for example, the controller 1320 may manage the contact unit 1310 and the antenna unit 1330 and may control the other components. In addition, the above-described components may be implemented in hardware or software. That is, the above-described components may be physically included in the identity device 1300 or may be a software component operating based on the operation and function of the identity device 1300, without being limited to the above-described embodiment.

The controller 1320 of the identity device 1300 according to an exemplary embodiment of the present disclosure may be a processor (e.g., computer, microprocessor, CPU, ASIC, circuitry, logic circuits, etc.). The controller 1320 may be implemented by a non-transitory memory storing, e.g., a program(s), software instructions reproducing algorithms, etc., which, when executed, controls operations of other units of the identity device 1300 and various components of the vehicle, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

Figure 14:
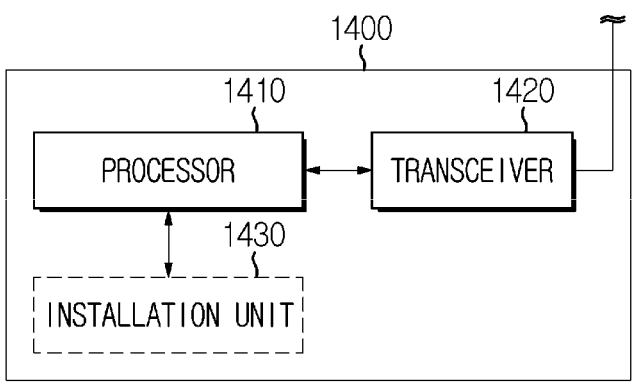
FIG. 14 is a view showing the configuration of an apparatus according to one exemplary embodiment of the present disclosure.

FIG. 14 is a view showing the configuration of an apparatus according to one exemplary embodiment of the present disclosure. Referring to FIG. 14, the apparatus may include at least one of the above-described moving object, a device, a sever or an RSU. That is, the apparatus may communicate or cooperate with another device, without being limited to the above-described embodiment. For example, the apparatus 1400 may include a processor 1410 and a transceiver 1420 for the above-described operation. That is, the apparatus may include a component necessary to perform communication with anther apparatus. In addition, for example, the apparatus may include components other than the above-described components. That is, the apparatus includes the above-described components in order to perform communication with another device, without being limited thereto, and may operate based on the foregoing.

In addition, for example, the apparatus 1400 may further include an installation unit 1430 in which another device (e.g., the identity device) is installed. At this time, the installation unit 1430 may be included in the moving object in the form shown in FIGS. 2a to 2d. For example, the installation unit 1430 may be implemented in any one area of the front side of the driver's seat in the moving object. In addition, for example, the installation unit 1430 may be implemented in the passenger seat kit inside the moving object. In addition, for example, the installation unit 1430 may be implemented in the mirror inside the moving object. In addition, for example, the installation unit 1430 may be implemented in the moving object in the form of a cradle or a paddle, as described above. That is, the apparatus 1400 may further include the installation unit 1430 for recognizing the identity device as another device, as described above, recognize another device based on the same, and perform authentication. For example, the installation unit 1430 may be implemented in the moving object. At this time, the installation unit 1430 may be implemented in the apparatus 1400 as a physical component. As another example, the installation unit 1430 may be implemented in the apparatus 1400 as a software component. At this time, when the installation unit 1430 is implemented in the apparatus 1400, the identity device may be implemented in the apparatus 1400 as a physical or software component as described above, without being limited to the above-described embodiment.

According to some aspects of the present disclosure, it is possible to provide a fleet system using an identity device.

According to some aspects of the present disclosure, it is possible to provide a moving object sharing service using an identity device.

According to some aspects of the present disclosure, it is possible to provide a method of recognizing a moving object owner and a moving object renter using an identity device.

The technical problems solved by the present disclosure are not limited to the above technical problems and other technical problems which are not described herein will become apparent to those skilled in the art from the above description.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A method of providing a moving object sharing service using a plurality of identity devices, the method comprising:
controlling a moving object based on a first identity device;
transferring control authority of the moving object to a second identity device when the second identity device is recognized in the moving object; and
controlling the moving object based on the second identity device,
wherein the first identity device corresponds to a first user who provides sharing of the moving object, and
wherein the second identity device corresponds to a second user who uses the moving object shared by the first user.

2. The method according to claim 1, wherein the moving object performs identification and authentication of the second user corresponding to the second identity device when the second identity device is installed in the moving object, and
the second identity device is recognized in the moving object when the identification and authentication of the second user are completed.

3. The method according to claim 2, wherein, when the identification and authentication of the second user are completed, the moving object changes setting information of the moving object based on the second identity device.

4. The method according to claim 3, wherein the setting information of the moving object includes at least one of a position of a driver's seat, a height of the driver's seat, a color of an interior lighting, brightness of the interior lighting, a position of a room mirror, an angle of the room mirror, a position of a side-view mirror, an angle of the side-view mirror, an inside temperature, an angle of a steering wheel, tire pressure, an autonomous driving function setting variable, a transmission setting mode, a dashboard mode, navigation settings, content settings, or a wireless communication connection mode.

5. The method according claim 1, wherein the moving object receives a moving object use request message from a device of the second user who uses the moving object, through the first identity device before recognizing the second identity device, and transmits a response message as to whether to use the moving object to the device of the second user who uses the moving object, based on the moving object use request message.

6. The method according to claim 5, wherein the moving object performs identification and authentication of the second user corresponding to the second identity device when the moving object allows use of the moving object based on the moving object use request message, and
the second identity device is recognized in the moving object when the identification and authentication of the second user is completed.

7. The method according to claim 1, wherein the first identity device stores information related to use of the moving object when the second identity device is recognized in the moving object.

8. The method according to 7, wherein the first identity device transmits the information related to use of the moving object to a device of the first user who provides sharing of the moving object, via a first network based on the first identity device.

9. The method according to 1, wherein, when an event occurs in the moving object in a case where the moving object is controlled based on the first identity device, the first identity device transmits information on the event to the device of the first user who provides sharing of the moving object, via a first network.

10. The method according to 1, wherein, when an event occurs in the moving object in a case where the moving object is controlled based on the second identity device, the second identity device transmits information on the event to a device of the second user who uses the moving object, via a second network.

11. The method according to 1, wherein, when the second identity device is detached from the moving object, the control authority of the moving object is transferred to the first identity device.

12. The method according to 11, wherein the second identity device is not detachable from the moving object when the moving object is turned on, and
the second identity device is switched to a detachable state when the moving object is turned off.

13. The method according to 11,
wherein an additional authentication procedure for detachment is performed before the second identity device is detached from the moving object, and
wherein, when authentication is completed based on the additional authentication procedure, the second identity device is switched to a detachable state.

14. The method according to 13,
wherein, when the additional authentication procedure is performed, the moving object transmits an authentication request message to a device corresponding to the first identity device, and
wherein the authentication is completed when the moving object receives an authentication response message including authentication complete information from the device corresponding to the first identity device.

15. The method according to 14,
wherein at least one of the first identity device or the device corresponding to the first identity device determines whether the moving object is abnormal based on at least one of position information, setting information, or status information of the moving object, and
wherein, upon determining that the moving object is normal, the authentication response message including the authentication complete information is transmitted to the moving object.

16. The method according to 1,
wherein the first identity device stores setting information for the first user who provides sharing the moving object, and
wherein the second identity device stores setting information for the second user who uses the moving object.

17. The method according to 1, wherein, when the second identity device is recognized and the control authority of the moving object is transferred, the second identity device is detached from the moving object.

18. The method according to 1,
wherein the first identity device is an embedded identity device, and
wherein the second identity device is an installed identity device.

19. A moving object for providing a sharing service through a plurality of identity devices, the moving object comprising:
a transceiver configured to transmit and receive a signal; and
a processor configured to control the transceiver,
wherein the processor is configured to:
control the moving object based on a first identity device,
transfer control authority of the moving object to a second identity device when the second identity device is recognized in the moving object, and
control the moving object based on the second identity device,
wherein the first identity device corresponds to a first user who provides sharing of the moving object, and
wherein the second identity device corresponds to a second user who uses the moving object shared by the first user.

20. A fleet system comprising:
a moving object; and
a plurality of identity devices,
wherein the moving object is controlled based on a first identity device,
wherein control authority of the moving object is transferred to a second identity device when the second identity device is recognized in the moving object,
wherein the moving object is controlled based on the second identity device,
wherein the first identity device corresponds to a first user who provides sharing of the moving object, and
wherein the second identity device corresponds to a second user who uses the moving object shared by the first user.

* * * * *